US008255291B1

(12) United States Patent
Nair

(10) Patent No.: US 8,255,291 B1
(45) Date of Patent: Aug. 28, 2012

(54) SYSTEM, METHOD AND APPARATUS FOR INTERACTIVE AND COMPARATIVE SHOPPING

(75) Inventor: Mark Nair, Amarillo, TX (US)

(73) Assignee: Tensilrus Capital NV LLC, Wilmington, DE (US)

(*) Notice: Subject to any disclaimer, the term of this patent is extended or adjusted under 35 U.S.C. 154(b) by 1199 days.

(21) Appl. No.: 11/674,134

(22) Filed: Feb. 12, 2007

Related U.S. Application Data

(63) Continuation-in-part of application No. 09/931,626, filed on Aug. 16, 2001, now Pat. No. 7,177,818.

(60) Provisional application No. 60/226,177, filed on Aug. 18, 2000.

(51) Int. Cl.
*G06Q 30/00* (2012.01)

(52) U.S. Cl. .................................................. 705/26.64

(58) Field of Classification Search ............... 705/26, 705/27, 26.1, 26.64
See application file for complete search history.

(56) References Cited

U.S. PATENT DOCUMENTS

| | | | | |
|---|---|---|---|---|
| 5,410,598 | A * | 4/1995 | Shear | 705/53 |
| 5,802,524 | A | 9/1998 | Flowers et al. | |
| 6,278,993 | B1 | 8/2001 | Kumar et al. | |
| 6,587,835 | B1 * | 7/2003 | Treyz et al. | 705/14.64 |
| 6,605,121 | B1 * | 8/2003 | Roderick | 715/207 |
| 6,976,006 | B1 * | 12/2005 | Verma et al. | 705/27 |
| 7,058,598 | B1 * | 6/2006 | Chen et al. | 705/26.62 |
| 7,107,226 | B1 * | 9/2006 | Cassidy et al. | 705/26 |
| 7,127,414 | B1 * | 10/2006 | Awadallah et al. | 705/26 |
| 7,246,110 | B1 * | 7/2007 | Musgrove et al. | 1/1 |
| 7,698,279 | B2 * | 4/2010 | Musgrove et al. | 707/999.01 |
| 7,761,345 | B1 * | 7/2010 | Martin et al. | 705/27 |
| 2002/0007461 | A1 * | 1/2002 | Garrison | 713/202 |
| 2002/0038238 | A1 * | 3/2002 | Fujita | 705/14 |
| 2003/0111531 | A1 * | 6/2003 | Williams | 235/383 |
| 2003/0187705 | A1 * | 10/2003 | Schiff et al. | 705/5 |

FOREIGN PATENT DOCUMENTS

| | | |
|---|---|---|
| EP | 0618708 A2 | 10/1994 |
| WO | WO 98/53410 | 11/1998 |
| WO | WO 99/57656 | 11/1999 |
| WO | WO 01/77883 | 10/2001 |

OTHER PUBLICATIONS

Business editors, "ShopNow.com Acquires Leading Shopping Bot, bottomdollar.com," Business Wire, New York, Dec. 20, 199, p. 1.*
Saharia, Aditya N. et al., "Enhancing Data Warehouse Performance Through Query Caching," Database for Advances in Information Systems, New York, Summer 2000, vol. 31, iss. 3, p. 43.*
Web-page from www.howstuffworks.com from Oct. 1, 2006.
Final Office Action on U.S. Appl. No. 09/931,626, mailed Jun. 27, 2006.
International Preliminary Examination Report on PCT/US01/025589, completed Oct. 15, 2007.
International Search Report on PCT/US01/025589, mailed Feb. 17, 2003.

(Continued)

*Primary Examiner* — Amee A Shah

(57) ABSTRACT

A method and system allows a user to aggregate product information or compare multiple products by a single query. A sales representative or end consumer is provided quick access to accurate detailed product information and comparison information, which can make shopping less confusing. The method involves generating a comparison report of two or more products, including detailed product information.

14 Claims, 27 Drawing Sheets

OTHER PUBLICATIONS

Non-Final Office Action on U.S. Appl. No. 09/931,626, mailed Oct. 7, 2005.

Non-final Office Action on U.S. Appl. No. 11/705,003, mailed Jan. 21, 2010.

Notice of Allowance on U.S. Appl. No. 09/931,626, mailed Oct. 18, 2006.

Final Office Action on U.S. Appl. No. 11/705,003, mailed Aug. 31, 2010.

* cited by examiner

Comparison Report

Samsung LN-S4095D 40" 1080p LCD HDTV

- 40-Inch (diagonal) LCD Screen with 16-9 Widescreen Aspect Ratio
- Up to 178-Degree Viewing Angles (Horizontal and Vertical)
- Progressive Scan mode at 480p-720p – 1080p
- 2 HDMI Connections, Sony KDL-40XBR2 40" 1080p LCD HDTV

- 16:9 1080p HD Resolution Panel (1920 x 1080)
- BRAVIA Engine PRO Video Processor
- Live Color Creation System featuring WCG-CCFL backlight
- ATSC Digital Tuner with QAM capability Scroll for more information.

FIG. 25

SYSTEM, METHOD AND APPARATUS FOR INTERACTIVE AND COMPARATIVE SHOPPING

CROSS REFERENCE TO RELATED APPLICATIONS

The present application is a continuation-in-part of U.S. patent Ser. No. 09/931,626, filed Aug. 16, 2001, now U.S. Pat. No. 7,177,818, which claims priority to U.S. Provisional Patent Application Ser. No. 60/226,177, filed Aug. 18, 2000, the disclosures for which are incorporated herein by reference.

BACKGROUND OF THE INVENTION

This invention relates generally to electronic commerce ("e-commerce") over the Internet, and more specifically to a method and system for assisting a user to efficiently search for specific product, price, and promotional information from a multitude of e-commerce websites.

One of the main problems with the proliferation of data now available on the Internet is the massive amount of information, attractions, and website locations available to the user. Internet users are burdened with information overload and most users will decide that their time is too valuable to flail about aimlessly, looking for specific information. Thus, these overburdened users resort to simply using a few familiar websites to avoid having to sift through extraneous information. Unfortunately, these users deprive themselves of much of the useful information that is available on the multitude of e-commerce websites that now exist.

A solution for handling this information deluge came in the form of search engines that take a user's query and try to excavate useful information from different websites. While the theory behind these websites is sound, in practice they can exacerbate the very problem that their design had hoped to avoid. At issue is whether these search engines, which scour the Internet for an answer to the user's query, are particularly successful in delivering either a solid abstract of information or in listing a series of websites that have a demonstrable link to the content that interests the user. For the most part, these search engines continue to overwhelm the user with irrelevant information. Indeed, even "portal" websites, which claim to narrowly limit the user's browsing experience based on the query criterion that the user has defined, offer an overflow of information. In response to this problem, the "bot" was created.

The bot itself is nothing more than an automatic computerized function that acts on pre-programmed behaviors. Much like an air conditioner or sprinkler system that turns on when certain conditions develop, the bot has specific criterion or rules that command its behavior. Portal websites, by their very nature, utilize bots that acquire information and then index that data for users' queries. However, the bot functionality in the case of portal websites is autonomous from the user's search since it does not search the Internet as a whole each time the user posits a question. Instead, the search engine searches its own indexed database that its bot has already constructed.

This design, although functional, has its limitations. Primarily the search engine is limited in its ability to present timely, updated information. If, for example, contextual information on e-commerce websites changes quite dramatically from minute to minute, the traditional bot methodology fails to update this dynamic flow of data. When the user queries the bot's findings, the search engine presents information that is both old and erroneous. If a user relies on such flawed and outdated information to make an immediate economic decision, e.g. deciding whether to make a purchase based on the price of an item as it is reported by the search engine, the results can be extremely unfortunate.

A natural implementation of the information bot is to aid users in shopping efficiently on the Internet. With the variety of Internet shops, stores, and malls, a rational and price-minded consumer can have difficulty evaluating, monitoring, and comparing prices, quality, quantity, and availability of goods. Moreover, with the limitations of traditional search engines, the user can have trouble locating timely, up to date information concerning desired goods. What is needed is a bot capable of executing instructions to locate price and other product information based on a user's shopping criteria and instructions to regularly update such information thus allowing a shopper to quickly and efficiently find the best Internet e-commerce website for their eventual transaction.

Finding reliable product information is particularly troublesome to both consumers, shoppers, and sales representatives. Because of the wide variety of products in the marketplace that, superficially, might appear very similar to other products, there's a high risk of confusion to consumers and purchasers. Consumers can research products online or in a brick-and-mortar location, but these manual comparisons often lead to frustration.

Retailers and sellers will sometimes present their salespeople as experts or provide online information to help consumers differentiate products in the marketplace, but more often than not these forms of information are limited in their scope and only help to provide the consumer with more frustration or, worse, erroneous information and data. What is needed is a way of organizing information quickly and accurately for reference by both sales representatives and end consumers

SUMMARY OF THE INVENTION

The present invention is a method and system that overcomes the problems described above by allowing a user to aggregate product information or compare multiple products by a single query. An advantage of the present invention is that the sales representative or end consumer can access detailed product information and comparison information quickly and accurately, making shopping less confusing.

These and other advantages are achieved in a system for assisting a user to efficiently query for product information and comparison information, the system including a mobile device enabled to accept product information and to display a comparison report; a connection between the mobile device and a product information service; and the product information service having a database with product information stored therein, the database generating a comparison report in response to a user query, where the displaying is in the format of a web page, news feed, instant messaging, text messaging, phone call or phone call with text to speech or other content delivery mechanism.

These and other advantages are also achieved in a method, associated with the system, for assisting a user to efficiently query for product information and comparison information. The method includes obtaining product information in a device; querying a database, by the device, using the product information, where the database calls up detailed information for each product using the product information, compares the detailed information for each product, and creates a differences list; receiving, by the device, the differences list created by the database; and displaying, on the device, the differences list to the user, where the displaying is in the format of instant messaging, text messaging, phone call or phone call with text to speech or other content delivery mechanism.

BRIEF DESCRIPTION OF THE DRAWINGS

The accompanying drawings are incorporated in and constitute a part of this specification and, together with the description, explain the advantages and principles of the invention. In the drawings.

FIG. 25 is a screen shot of a device displaying the results of the comparative report, allowing the shopper access to the comparative information about a number of related products;

DETAILED DESCRIPTION OF THE PRESENT INVENTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions.

Embodiments of the present invention include a system and method (including services, processes, logistics, and technology) for efficiently searching e-commerce websites that overcome the difficulties and obstacles currently present. The term "e-commerce", as used herein, refers to electronic commerce, electronic business and any other commerce and business conducted over the Internet, or other network, in which items are offered for purchase. The term "item(s)", as used herein, refers to products, services, and other things, tangible and intangible, that can be purchased.

Figure 1A:
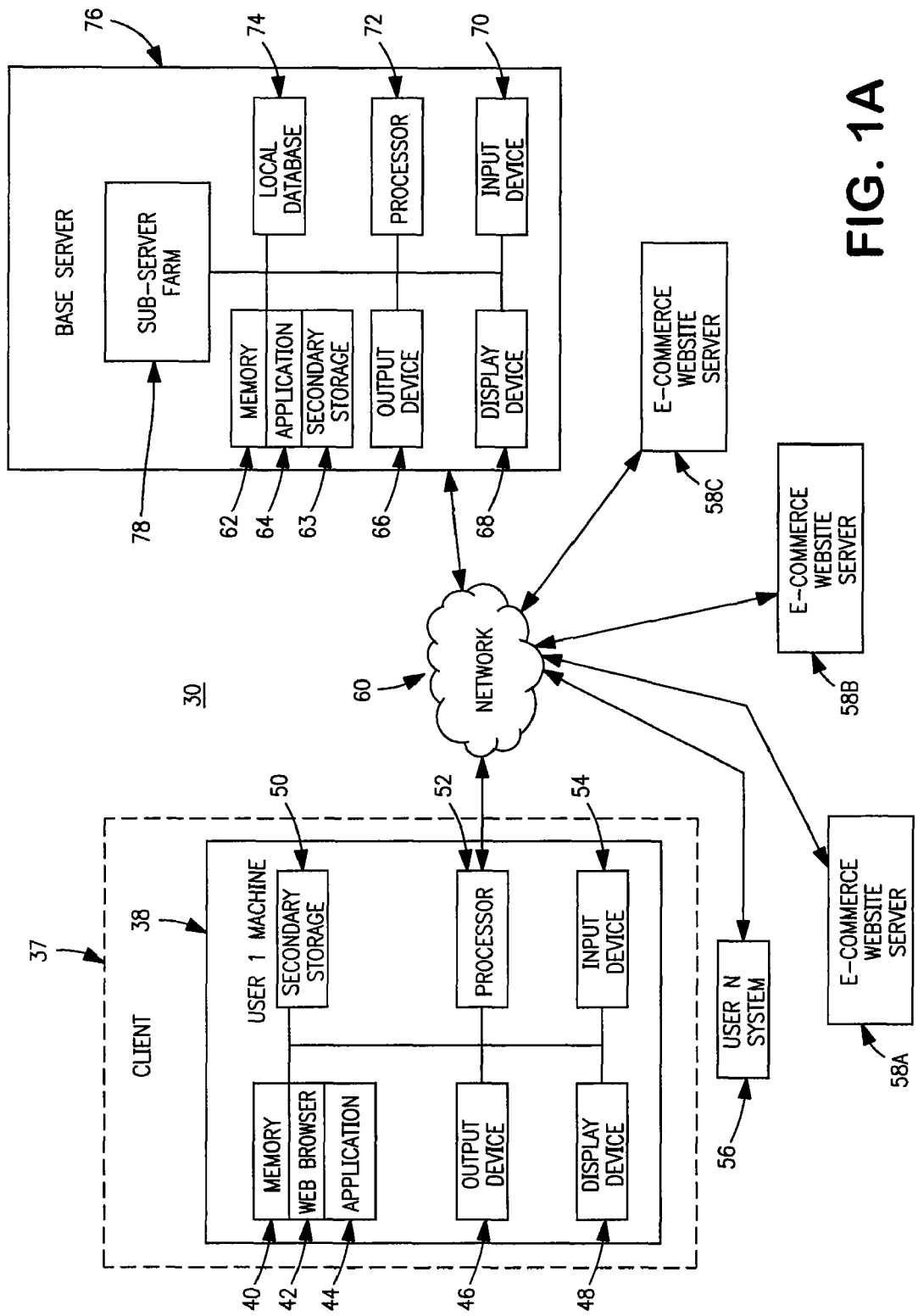
FIGS. 1A and 1B are block diagrams for a system for facilitating efficient searching of e-commerce websites over the Internet.

With reference now to FIG. 1A, there is illustrated a block diagram showing exemplary hardware components for implementing an interactive shopping system, generally designated by the reference numeral 30, and methods described hereinbelow for efficiently searching e-commerce websites. Interactive shopping system 30 includes a client, generally designated by the reference numeral 37, or user system, having a user machine 38 therein connected with a network 60, such as the Internet, providing a network connection for searching representative e-commerce website servers 58A, 58B, 58C, etc. that are available to the interactive shopping system 30. Other clients, such as client 56, may also be connected with network 60 for searching e-commerce websites. It should, of course, be understood that client 56, and other clients, may include the same components as client 37.

There are generally two preferred methods for determining whether or not to list an e-commerce website as an available website. First, a partnership arrangement may be reached between the e-commerce website's operators and the operators of the interactive shopping system 30. The partnership agreement allows the operators of the interactive shopping system to designate the e-commerce website as an available website and to gather product and promotional information from the e-commerce website. Another possibility is for the operators of the interactive shopping system 30 to monitor the e-commerce landscape and, based on editorial guidelines (e.g., depth of an e-commerce website's product catalogue, ease of website navigation) and a particular e-commerce website's competition, the operators of interactive shopping system 30 can decide to designate the e-commerce website as an available website. The operators can then navigate the e-commerce website and gather the necessary product and promotional information.

Figure 1B:
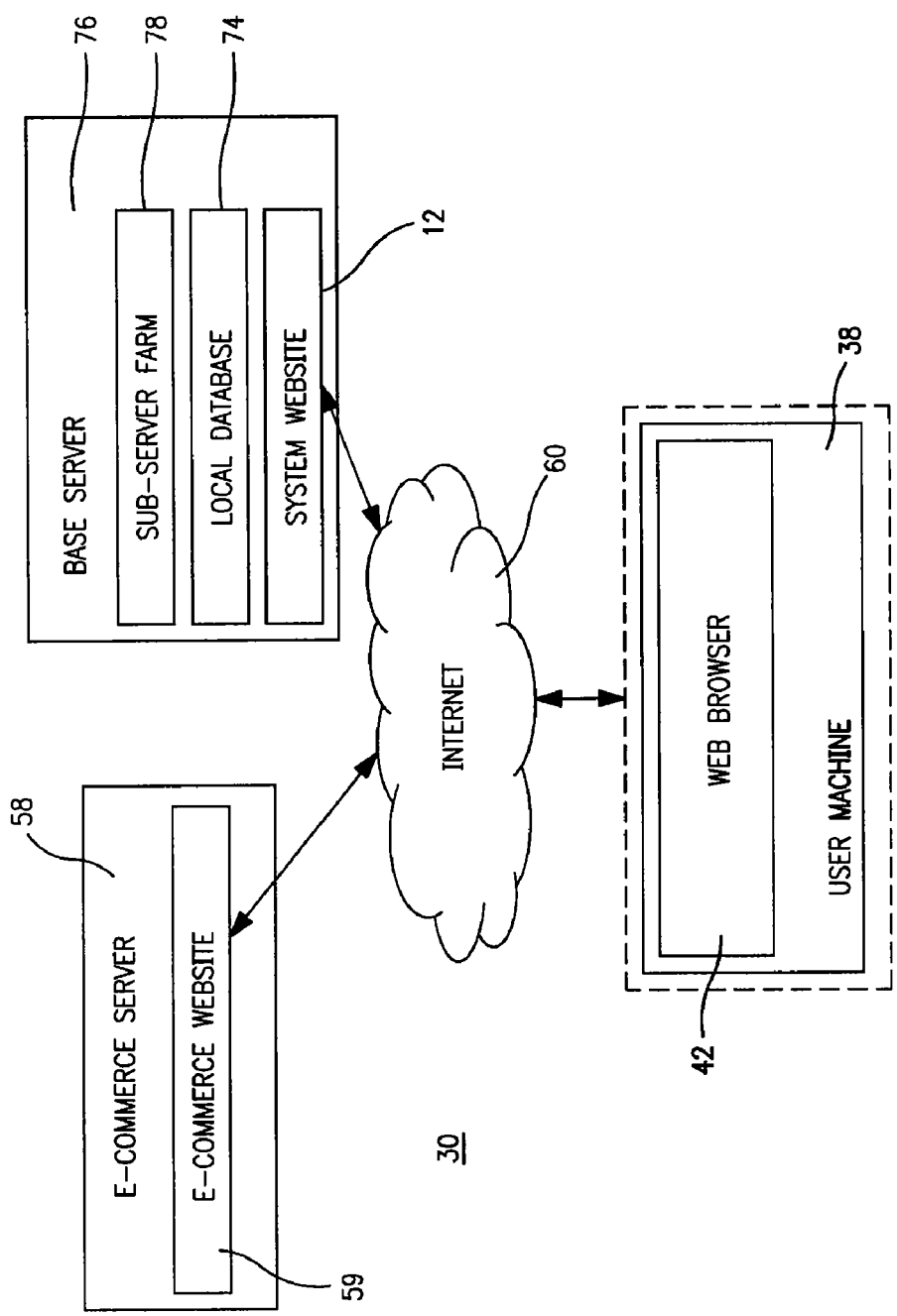

With reference now to FIG. 1B, users at clients 37 and 56 (as shown in FIG. 1A) interact with a base server 76 through the user machine 38 to search e-commerce websites for product, price, promotional, comparative and other information. Base server 76 provides and maintains a system website 12 for providing a network connection for the client 37 to the system website 12 on the base server 76. The interactive shopping system 30, through the base server 76, can process a user query by way of a sub-server farm 78, the results of which can be stored within a local database 74. Interactive shopping system 30 processes a user query by allowing the base server 76 to access one or more of the aforedescribed e-commerce website server(s) 58 (maintained by third-party e-tailors) in order to search a number of e-commerce website(s) 59, or specifically the e-commerce website server(s) 58 that support the e-commerce website(s) 59, over the Internet or other network 60 for item information, e.g., item price, promotional, comparative or other information on the World Wide Web. Only one user system is shown for illustrative purposes only. It should, of course, be understood to one skilled in the art that the interactive shopping system 30 may include many user machines 38 and may be scalable to add or delete user machines 38 to or from the network 60.

Referring back to FIG. 1A, user machine 38 illustrates typical components of a user machine. User machine 38 typically includes a memory 40, a secondary storage device 50, a processor 52, an input device 54, a display device 48, and an output device 46. Memory 40 may include random access memory (RAM) or similar types of memory, and it may store one or more applications 44 and a web browser 42, for execution by processor 52. Secondary storage device 50 may include a hard disk drive, floppy disk drive, CD-ROM drive, or other types of non-volatile data storage, as understood in the art. Processor 52 may execute applications or programs stored in memory 40 or secondary storage 50 or received from the Internet or other network 60. Input device 54 may include any device for entering information into the user machine 38, such as a keyboard, mouse, cursor-control device, touch-screen, infrared, microphone, digital camera, video recorder, camcorder, and a mobile or portable device such as a scanner, card reader, mobile phone or other device. Display device 48 may include any type of device for presenting visual information such as, a computer monitor, flat-screen display, mobile device display or other form of interface. Output device 46 may include any type of device for presenting a hard copy of information, such as a printer, and other types of output devices include speakers or any device for providing information in audio form.

Web browser 42 is used to access application(s) 64 on the base server 76 through the system website 12, as illustrated in FIG. 1B, and display various HTML webpages through which the user can search e-commerce websites 59 for item, promotional, comparative and other information. Examples of these HTML webpages are described below. Examples of web browsers include the Netscape Navigator program and the Microsoft Internet Explorer program. Any web browser, co-browser, or other application capable of retrieving content from a network and displaying pages or screens may be used.

Examples of user machines for interacting with the system website 12 include personal computers, laptop computers, notebook computers, palm top computers, mobile devices, such as a scanner, card reader, mobile phone or like device, network computers, or any processor-controlled device capable of executing a web browser or other type of application for interacting with the system.

Figure 7:
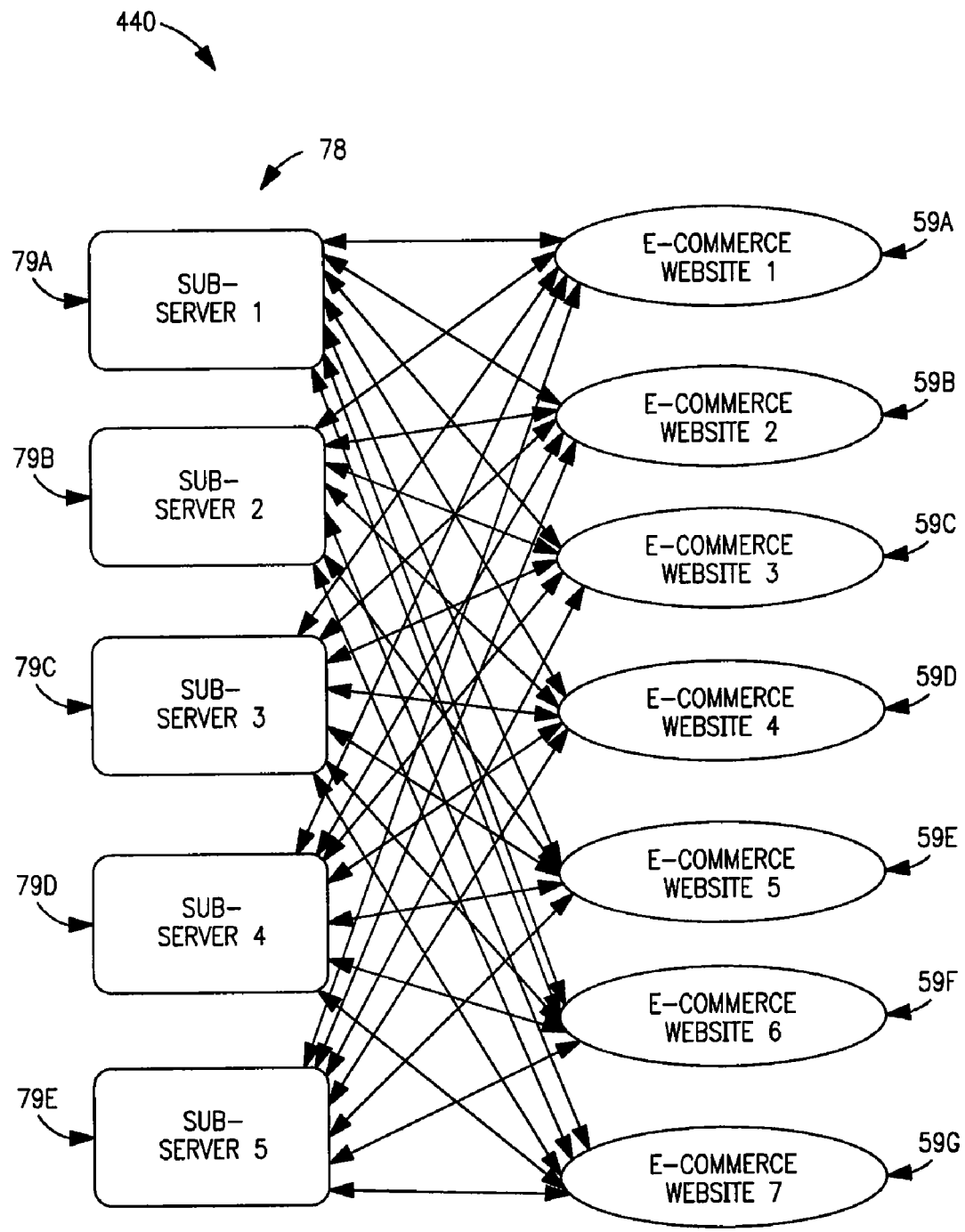
FIG. 7 is a diagram of a sub-server farm linking and searching for information from various e-commerce websites.

Base server 76 typically includes a memory 62, a secondary storage device 63, a processor 72, an input device 70, a display device 68, and an output device 66. The base server 76 preferably also includes the aforementioned sub-server farm 78, which sends out sub-servers 79 (see FIG. 7) to actively search the aforedescribed e-commerce website servers 58A, 58B, 58C, etc. for item, promotional, comparative and other information. The sub-servers 79 may include all or some of the elements present in the aforedescribed base server 76. Memory 62 may include RAM or similar types of memory, and it may store one or more applications 64 for execution by the processor 72. Secondary storage device 63 may include a hard disk drive, floppy disk drive, CD-ROM drive, or other types of non-volatile data storage. Processor 72 executes the application(s) 64 (e.g., search and display instructions as described below) that is preferably stored in memory 62, secondary storage 63, or received from the Internet or other network 60. Input device 70 may include any device for entering information into the base server 76, such as a keyboard, mouse, cursor-control device, touch-screen, infrared, microphone, digital camera, video recorder or camcorder, a mobile device, such as a scanner, card reader, mobile phone or like device. Display device 68 may include any type of device for presenting visual information such as, for example, a computer monitor, flat-screen display, mobile device display or other forms of interface. Output device 66 may include any type of device for presenting a hard copy of information, such as a printer, and other types of output devices include speakers or any device for providing information in audio form.

Local database 74 may maintain a relational or object-oriented database (or any other type of database) for storing information concerning item, promotional, comparative and other information that is received by the base server 76 when the sub-server farm 78 performs searches of the various e-commerce website servers 58A, 58B, 58C, etc. This information includes: the searched e-commerce websites' universal resource locators ("URLs"), item identification data, item price and/or description data, promotional information, comparative information and other information.

Also, processor 72 may execute one or more software applications 64 in order to provide the functions described in this specification, and the processing may be implemented in software, such as software modules, for execution by computers or other machines. The processing may provide and support the searching methods and display methods described in this specification and otherwise for display on display devices associated with the user machines 38. The term "screen" refers to any visual element or combinations of visual elements for displaying information or forms; examples include, but are not limited to, user interfaces on a display device, such as a laptop or computer, mobile device, and information displayed in webpages on a display device. The screens may be formatted, for example, as webpages in HyperText Markup Language (HTML), Extensible Markup Language (XML) or in any other suitable form for presentation on a display device depending upon applications used by users to interact with the system.

The screens include various sections, as explained below, to provide information or to receive information or commands. The term "section" with respect to screens refers to a particular portion of a screen, possibly including the entire screen. Sections are selected, for example, to enter information or commands or to retrieve information or access other screens. The selection may occur, for example, by using a cursor-control device (i.e., a mouse) to "click on" or "double-click on" the section; alternatively, sections may be selected by entering a series of keystrokes or in other ways such as through voice commands or use of a touch screen. In addition, although the screens described below illustrate a particular arrangement and number of sections in each screen, other arrangements are possible and different numbers of sections in the screens may be used to accomplish the same or similar functions of displaying information and receiving information or commands, e.g., configurations suitable for mobile devices requesting the information. Also, the same section may be used for performing a number of functions, such as both displaying information and receiving a command.

Although only one base server 76 is shown, interactive shopping system 30 may use multiple servers as necessary or desired to support the users and may also use back-up or redundant servers to prevent network downtime in the event of a failure of a particular server. In addition, although user machine 38 and base server 76 are depicted with various components, one skilled in the art will appreciate that these machines and the server can contain additional or different components. In addition, although aspects of an implementation consistent with the present invention are described as being stored in memory, one skilled in the art will appreciate that these aspects can also be stored on or read from other types of computer program items or computer-readable media, such as secondary storage devices, including hard disks, floppy disks, or CD-ROM; a carrier wave from the Internet or other network; or other forms of RAM or ROM. The computer-readable media may include instructions for controlling a computer system, such as user machine 38 and the base server 76, to perform a particular method.

An e-commerce website 59 typically includes object-oriented screens (e.g., HTML webpages) for each item or bit of promotional, comparative or other information offered by the e-commerce website 59. The screens typically comprise a pattern of strings that represent certain data (or information) about the items or the promotional or comparative information thereon. Generally, the string pattern is standard for all the items, promotional information, comparative or other information offered by a specific e-commerce website 59 so that the same strings represent the same type of data for each e-commerce webpage. Consequently, analyzing the e-commerce website 59 preferably includes viewing the e-commerce website 59 item screens and determining the string pattern(s) on the item screens that indicate the requisite data (e.g., e-retailer name, item name, item description, item type (e.g., camera, car, CD, book, etc.), item price, picture of item (e.g., a gif or jpeg of the item), and promotional, comparative or other information.

A. Overview of Interactive Information Service

Figure 2:
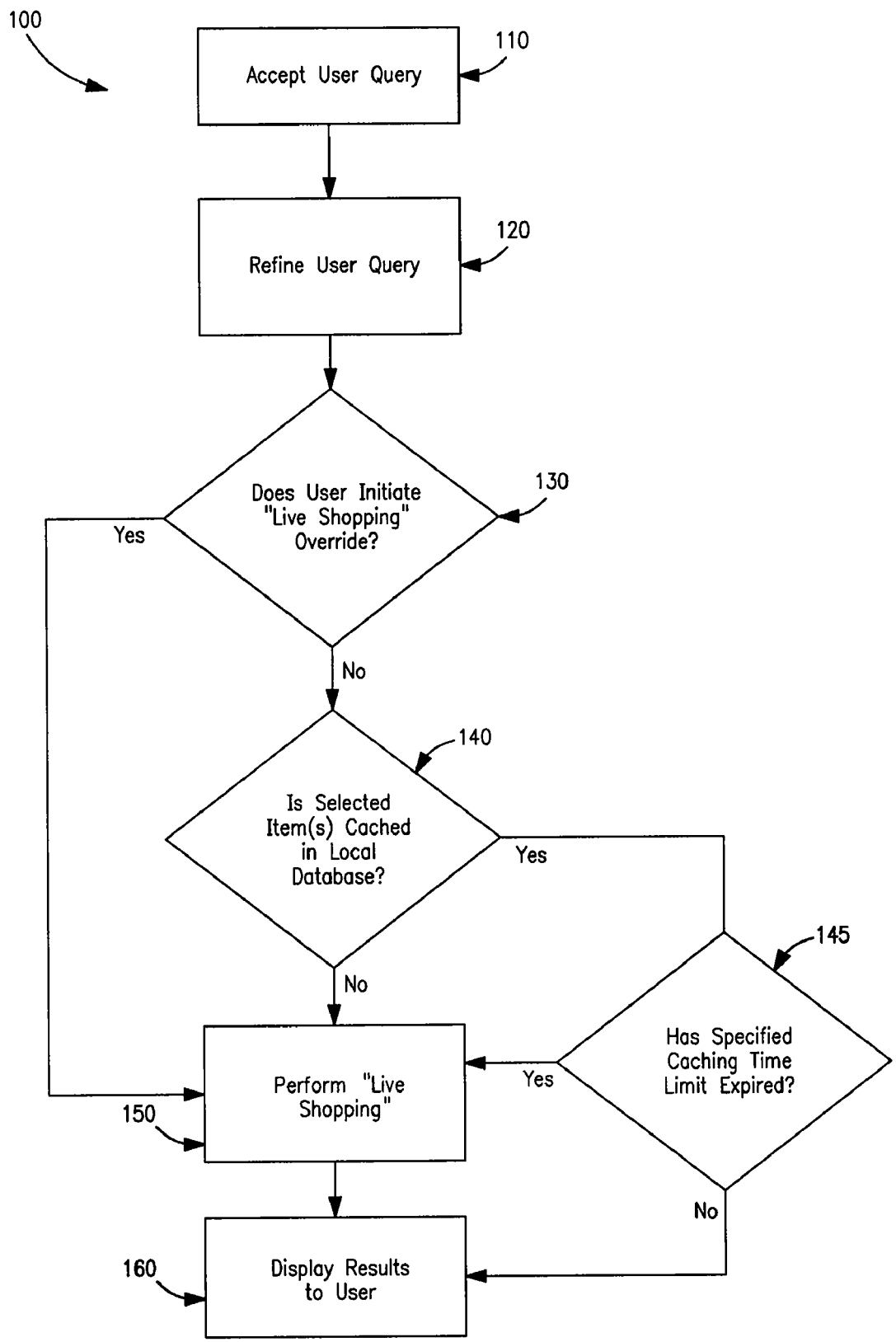
FIG. 2 is a flowchart describing a method for efficiently searching e-commerce websites over the Internet.

With reference now to FIG. 2 of the Drawings, there is illustrated a flow chart of a method, generally designated by the reference numeral 100, for efficiently searching e-commerce website(s) 59 for item, promotional, comparative and other information over the Internet. The method preferably includes: accepting a user query 110; refining the user query 120; determining whether a user has initiated a "live shopping" override 130; if the user has not initiated the override, determining whether information pertaining to a selected item(s) is cached in the local database 74 (step 140); determining whether a caching time limit has expired 145; if the information is not cached in the local database 74 or the user has initiated the override, performing "live shopping" 150; and displaying search results to the user 160.

Figure 3:
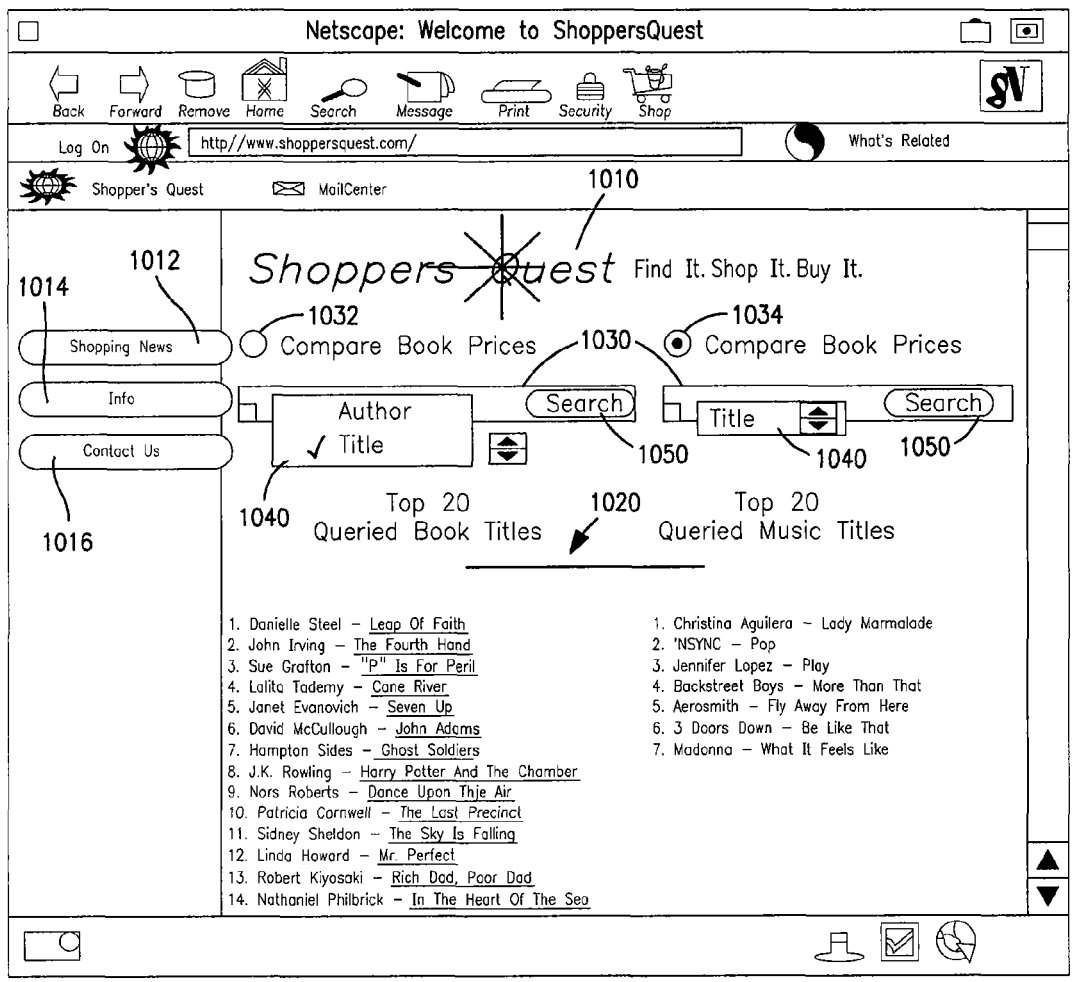
FIG. 3 is an illustration of a webpage interface for accepting user queries.

The accept user query step 110 preferably includes a user entering a query at the user machine 38 for item information, e.g., the item price, promotional comparative or other information through a user interface, e.g., a mobile or other device. FIG. 3 illustrates a preferred user interface, designated generally in the figure by the reference numeral 1000. User interface webpage 1000 is a webpage that is generated by the base server 76 and is displayed at the user machine 38. As indicated hereinabove, the interface 1000 may be configured differently for usage in alternative contexts, i.e., the user machine 38 may constitute a mobile device such as a cell phone or PDA, where space is limited. User interface webpage 1000 may include a logo 1010, a shopping news/promotional/comparative information request button 1012, a service information button 1014, a contact information button 1016, a list(s) of popular items 1020, query entry windows 1030, a search-type pop-up window 1040, and search activate buttons 1050, as are commonly understood in website design.

The user initiates a search for item information by entering a search term in query entry window 1030. The user can select search-type pop-up window 1040 in order to indicate the search term's field. For example, if the item of interest is a book, the search term could be the book's title or the book's author. Choosing the correct search term field allows the interactive shopping system 30 to narrow the focus of the search and to conduct the search for item information more efficiently. The user can then initiate the search procedure by selecting search activate button 1050.

Alternatively, the user can select an item from the list(s) of popular items 1020 rather than entering a search term in the query entry window 1030. If the user wishes to search for promotional, comparative or other information, the user can select the shopping news/promotional/comparative information request button 1012. Users desirous of particular comparative pricing can click on buttons designated for certain industries, e.g., compare book prices button 1032 and compare music prices button 1034, as illustrated in FIG. 3. It should be understood that a single query field, such as button 1050, can be employed to indicate a comparison search, e.g., using radio buttons. The procedure for searching for promotional, comparative and other information is described below in conjunction with FIGS. 12-16.

With reference again to FIG. 2, the refine user query step 120 preferably includes the base server 76 checking the local database 74 to determine whether any matches to the search term exist within the local database 74, thereby maximizing resources and minimizing extraneous communications. Any matching items that are found locally are then displayed to the user. The user can then select from any of the returned matching items thereby allowing the interactive shopping system 30 to conduct a subsequent search for item information more efficiently. The refine user query step 120 is shown and described with more detail with reference to FIG. 4, described in more detail hereinbelow.

Figure 9:
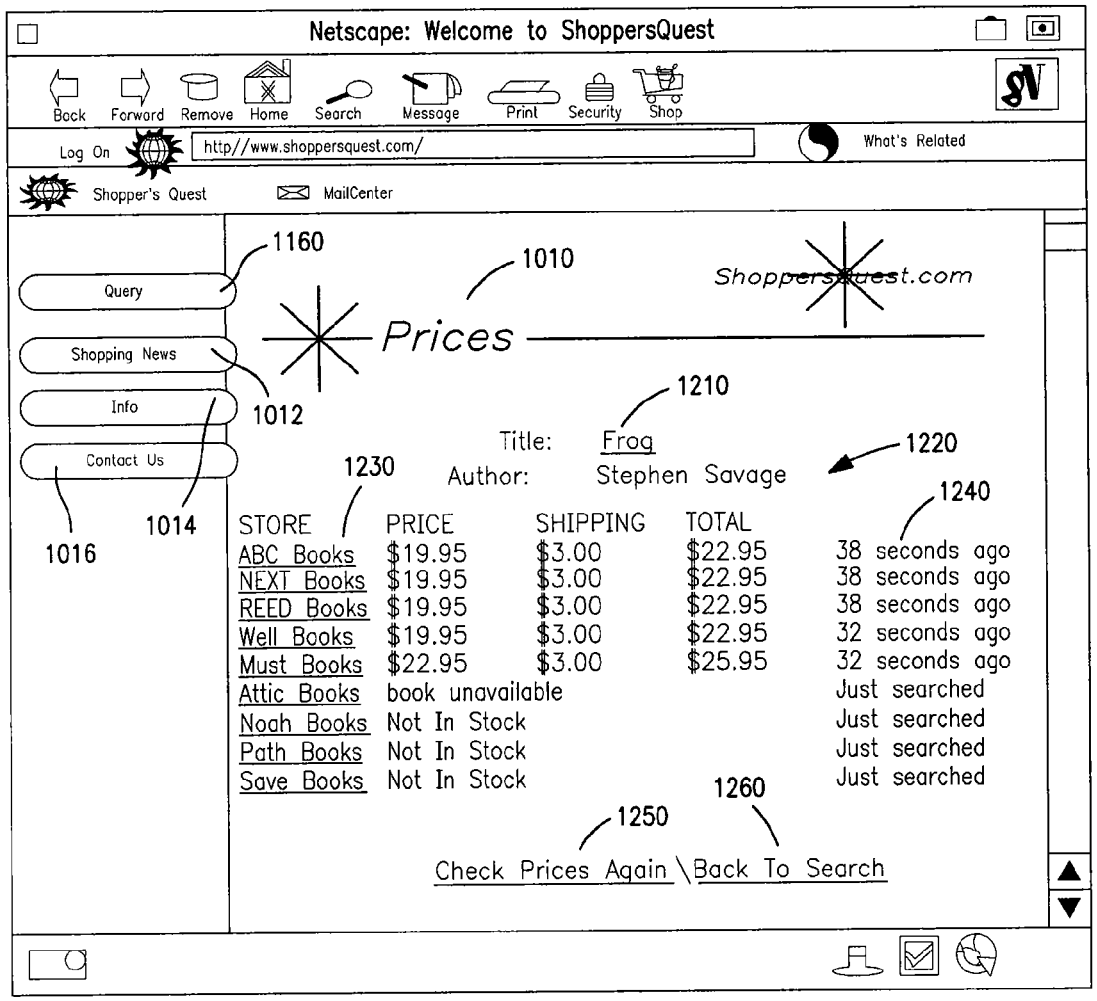
FIG. 9 is an illustration of a webpage displaying price search results.

With further reference to FIG. 2, step 130, i.e., determine whether a user has initiated a "live shopping" override, preferably includes the base server 76 determining whether the user has chosen to have the base server 76 perform "live shopping" regardless of whether information related to the selected item(s) is cached in the local database 74. The user, perhaps distrustful of the freshness of the local information or otherwise in need of the most up-to-date information, can initiate the override by selecting an override button, such as user override button 1250, as seen in FIG. 9 and described in more detail hereinbelow. If the user chooses the override, the base server 76 performs the "live shopping" step 150 shown in FIG. 2. If the user does not choose the override, then base server 76 checks the local database 74 for information related to the selected item, illustrated by step 140.

Step 140, i.e., determine whether information pertaining to a selected item(s) is cached in a local database 74, preferably includes the base server 76 checking the local database 74 for whether the requested item information, e.g., the price, promotional, comparative or other information about the item, has been cached by the local database 74 within a specified caching time limit. The caching time limit is a variable that is set dynamically depending on Internet congestion. The more congested the Internet is at a particular time, the less frequently the item information in local database 74 will be updated.

Caching item information in the local database 74 allows the base server 76 to preserve Internet bandwidth by enabling the base server 76 to avoid having to actively search the e-commerce website(s) 59 every time a user sends a query to the interactive shopping system 30. Instead, the base server 76 determines if the information concerning the selected item(s) has already been retrieved from the e-commerce website(s) 59, i.e., during a prior user query request, and cached by the local database 74 at some time within the specified caching time limit. For example, users may frequently search for prices on a popular book title. If users check for the price of the book title every 10 seconds, Internet congestion would increase severely if active searches of the e-commerce website(s) 59 over the Internet were made in each instance. By first checking the local database 74 for the price information instead of performing an active search, the base server 76 can therefore save Internet bandwidth. The base server 76 can inform the user of the time since the item information was last updated within the local database, as illustrated by a time of last update field 1240, described hereinbelow in connection with FIG. 9.

Since the caching process avoids adding to Internet traffic and speeds the search results to the user, the base server 76 can also use a similar caching implementation to ease the daily workload of the base server 76, or more particularly, the sub-server farm 78, which performs the actual searching of the e-commerce website(s) 59, as is described below. Nightly or periodically, the sub-server farm 78, which includes a plurality of sub-servers 59 (FIG. 7), sends out the sub-servers 59 to search out and cache information regarding certain items, e.g., the prices for the top 20 book and music titles, as well as promotional, comparative and other information. This information is used to populate the list(s) of popular items 1020 (FIG. 3).

It should be understood that the number of items included in list(s) of popular items 1020 is arbitrary and is determined based on the amount of queries each item cached in the local database 74 receives during a certain time period, e.g., during a single day. If, for example, the population of list(s) of popular items 1020 is limited to 2000 items, each night or periodically sub-servers 59 will cache the price, promotional, comparative and/or other information of all 2000 items in the local database 74. The prices, or other information, will remain in the local database until the next night's purge and re-cache of information. In effect, the base server 76 guarantees that it will refresh the list(s) of popular items 1020 nightly, although a user can always refresh the list on command by initiating a user override. It should, of course, be understood that the periodicity of the refresh is adjustable, e.g., by time, system availability or other measure.

With reference again to FIG. 2 of the Drawings, step 145, i.e., determine whether a caching time limit has expired, preferably includes the base server 76 checking whether or not the time since the item information cached in the local database 74 was last updated exceeds the caching time limit. The caching time limit can be stored in the memory 62, the secondary storage 63, or even in the local database 74 of the base server 76 and can be updated as necessary to reflect current Internet conditions, as described previously. Base server 76 can use a system clock (not shown) within processor 72 to keep track of the time that has elapsed since the local database 74 was last updated. If the information pertaining to the selected item(s) is not cached in the local database 74, has not been re-cached within the caching time limit, or the user initiates a user override, the base server 150 performs "live shopping", step 150.

The perform "live shopping" step 150 preferably includes the base server 76 transmitting a search request to the sub-server farm 78 and hence to the plurality of sub-server(s) 79. The sub-server(s) 79 act as "bots", gathering information, e.g., price, promotional and comparative information, from the e-commerce websites(s) based on the user query. If the sub-server 79 currently receiving the request is busy responding to a previous search request, the base server 76 transmits the search request to the next sub-server 79 in the sub-server farm 78 and then the next until a suitably non-stressed sub-server 79 can handle the search request. This process will typically take only a few 100ths of a second. The non-stressed sub-server 79 receives the search request and sends the search request to the sub-server's 79 assigned e-commerce website(s) 59. If a particular assigned e-commerce website 59 does not respond to the search request within 30 seconds, the sub-server 79 ends the request to that assigned e-commerce website 59, although the search request is maintained with respect to any other assigned e-commerce website(s) 59. Once the assigned e-commerce website(s) 59 responds to the search request, the sub-server 79 analyses the assigned e-commerce website(s) 59 for the information requested by the user query. Once searches for all selected items have been completed, the sub-server 79 sends the requested information to the base server 76. The base server 76 then updates the local database 74 with the information as described previously. The perform "live shopping" step 150 is shown and described in more detail with reference to FIG. 6 below.

The display results to the user step 160 preferably includes the base server first receiving the requested information from the sub-server farm 78. Alternatively, if the requested information was properly cached within the local database 74, the requested information is retrieved from the local database 74. In the situation where item price, promotional, comparative or other information was retrieved, the base server 76 arranges the prices for a specific selected item, preferably from lowest to highest, or arranges pursuant to the promotional, comparative or other formats or arrangements. Alternatively, the base server can arrange the selected item prices from highest to lowest or in some other arrangement. The base server 76 then associates the item information with the e-commerce website 59 from which the information was retrieved. Finally, the base server 76 creates an HTML webpage, or alternatively a webpage in XML or some other suitable language, and displays a search result webpage 1200 (FIG. 9). The display results to the user step is shown and described with more detail with reference to FIG. 8 below.

B. Refining A User Query

Figure 4:
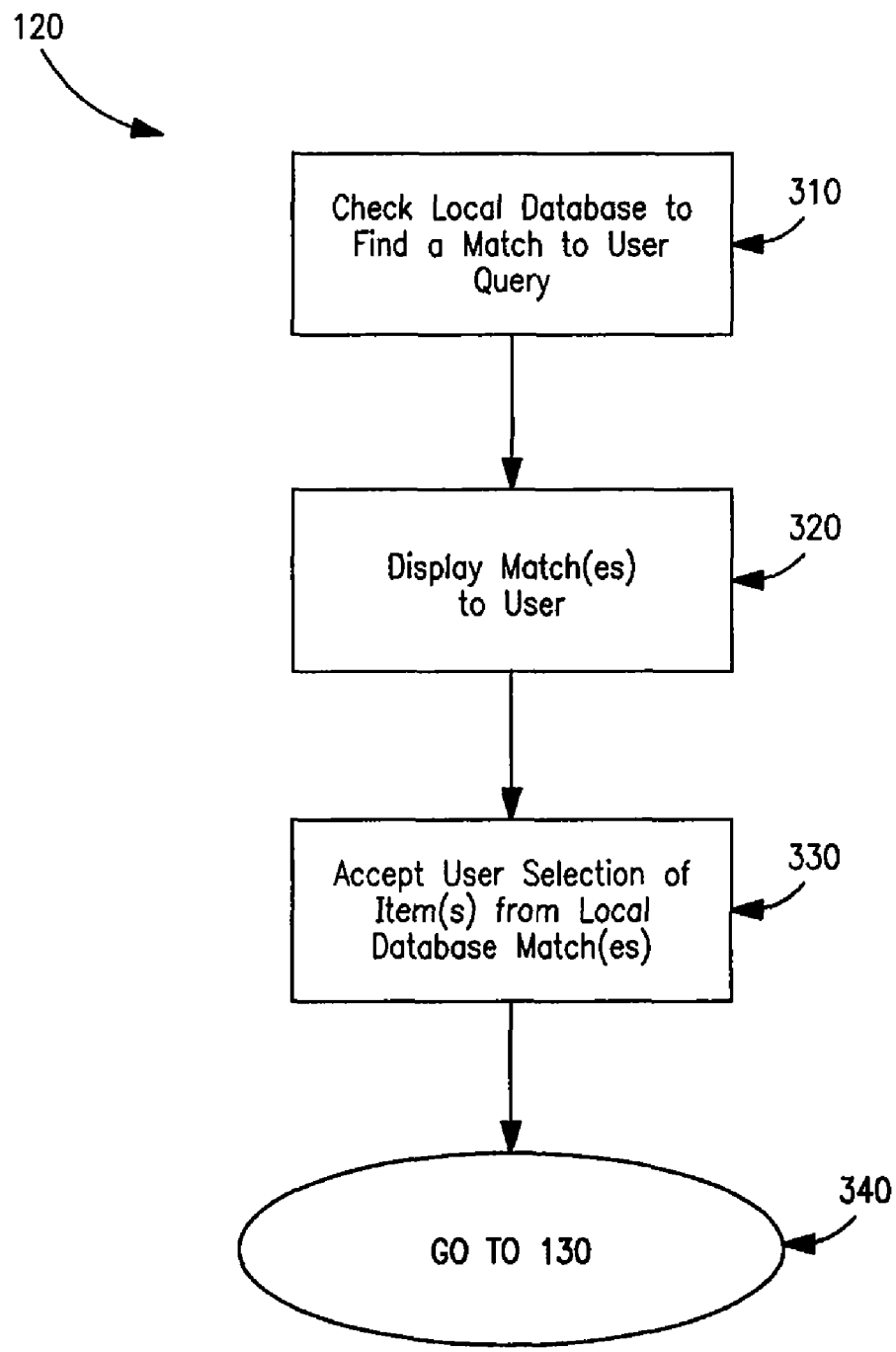
FIG. 4 is a flowchart describing a method for allowing a user to refine a query.

With reference now to FIG. 4 of the Drawings, there is illustrated a flowchart describing a preferred method, generally designated therein by the reference numeral 120, for refining the user query after the user initiates a search as described above. The method 120 preferably includes: checking the local database 74 to find a match to the user query, designated by the reference numeral 310; displaying any matches to the user 320; accepting user selection of item(s) from the local database 74 matches 330; and returning to the main method 100 (step 340), as shown in FIG. 2.

Once the user has entered the user query in the query entry window 1030 of the user interface webpage 1000, as illustrated in FIG. 3, the base server 76 checks 310 the local database 74 to find an item or items that matches to any search terms used in the user query. The primary goal of searching the local database 74 for matching items is to narrow the user query to the most specific piece of information in the local database 74. The more narrow the query, the more success the base server 76, or alternatively the sub-servers 79, will have in finding the correct item information, e.g., the correct price or other information. For example, if on the user interface webpage 1000, the user enters the word "Frog" into the query entry window 1030, the base server 76 will search the local database 74 for all instances of the word "Frog" in any of the local database's 74 indexed title fields. In an alternative embodiment the user can choose to limit the number of returns from the local database 74 by, for example, entering the number of returns the user wishes to retrieve. Similarly, for promotional, comparative or other information on an item, the user can enter a term or phrase as described hereinabove.

Figure 5:
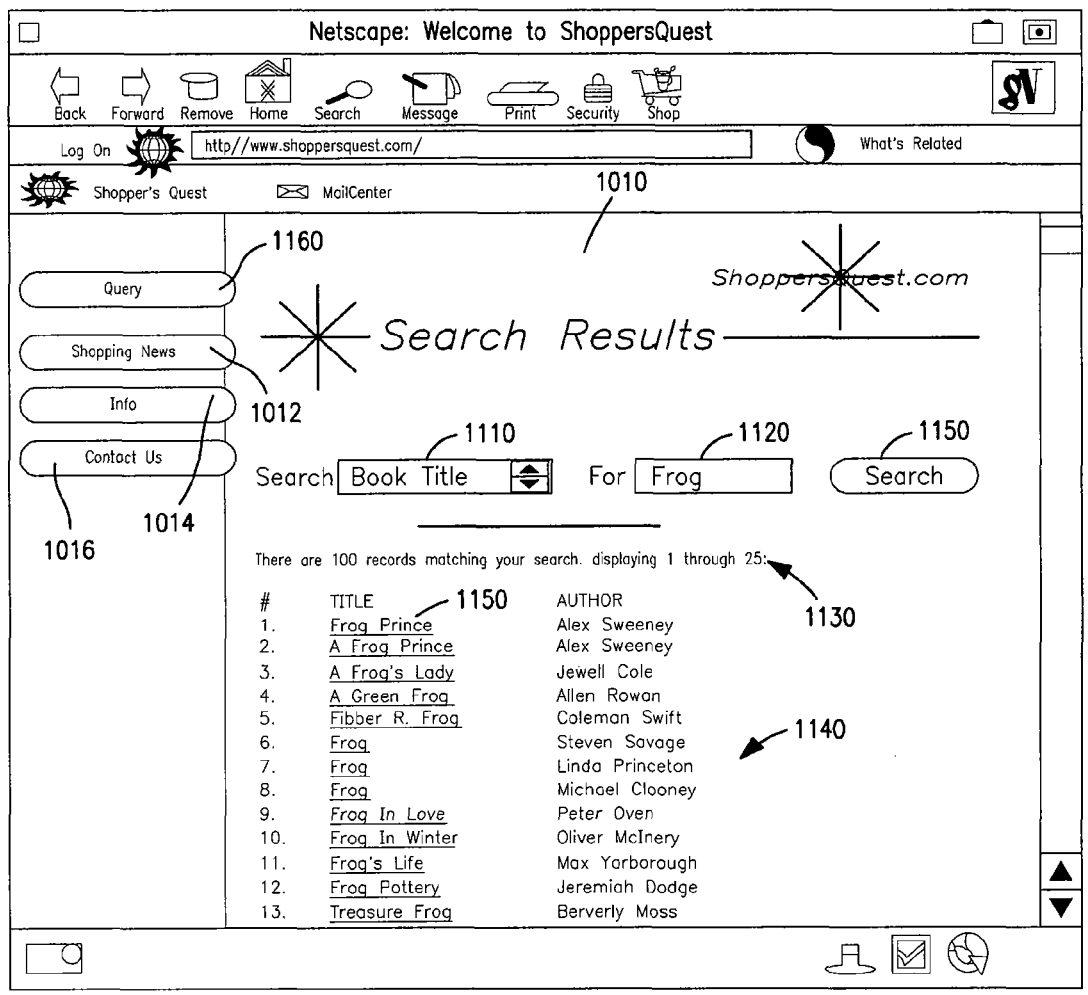
FIG. 5 is an illustration of a webpage displaying initial search results of a user query from which the user may refine the query.

The base server 76 displays 320 any matches found in the local database 74 to the user by way of a search results webpage 1100, as illustrated in FIG. 5. Search results webpage 1100 is a webpage that is generated by the base server 76 and is displayed at the user machine 38. Search results webpage 1100 may include a search-type indicator pop-up menu 1110, a search term indicator window 1120, a number of returns indicator 1130, a results list 1140, a search activation link 1150 and a query request button 1160, as well as features included in the user interface webpage 1000, i.e., a logo 1010, the shopping news/promotional/comparative information request button 1012, the service information button 1014, the contact information button 1016, and the search activate button 1050.

The search-type indicator pop-up menu 1110 displays the search term field the user selected when entering the user query. The search term indicator window 1120 displays the search term(s) the user entered into the query entry window 1030. The number of returns indicator 1130 displays the number of matches the base server 76 located in the local database 74, as well as the number of matches currently being displayed. The results list 1140 displays the item(s) located in the local database 74 that contained at least one term matching the search term(s). In FIG. 5, a list of book titles containing the word "Frog" is displayed.

Respective item names, or in this example, the book titles, are listed as respective search activation links 1150 in FIG. 5. By selecting a particular search activation link 1150 associated with a particular item, the user indicates that the selected item is the item about which the user wishes the base server 76 to display information. For example, by clicking on one of the items listed in the results list 1140, e.g., "Frog Prince" the first item listed, the user can initiate a price search for that particular item. Alternatively, the user can enter another search term in search term indicator window 1120, which can double as the aforementioned query entry window 1030, and thus reinitiate the local database 74 search for matching items. Refine user query method 120 (FIG. 4) then returns to the main method 100 (FIG. 2) in step 340.

If the local database 74 contains no matches to the user query either because the local database does not contain information on the requested product or because the user entered erroneous information, the base server 76 displays "as close as possible" matches gathered from the local database 74. If the user sees that nothing in the results list 1140 matches the user's query, the user then has the option of adding the requested item to the local database 74. In an alternative embodiment, a link (not shown) at the bottom of the search results webpage 1000 can read, "If we can't find it, tell us what you're looking for and we'll hunt it down for you."

A query field for the user's description of the desired item can accept a variety of descriptive terms. For example, a user can enter the following information: "That book that was banned by the government in 1920 or 1930. It was written by an Irish guy names James." The book in question in this example is, of course, *Ulysses* by James Joyce but the user, lacking the name of the book and the full name of the author, would be at a loss to find the novel in the local database 74 using a user query. Using the description provided by the user, an editorial staff can then find the appropriate title and send an e-mail to the user with the link to the title (or a link to a newly-created shopping list custom made for the user). If the descriptive title is not in the local database 74, the editorial staff may add the title to the local database 74 based on a user's recommendation. For a user's recommendation to be valid, the user must provide a valid e-mail address. The e-mail address allows the editorial staff to communicate to user that the title has been successfully added to the local database 74.

C. "Live Shopping"

Once the user has refined the user query, as described above, the base server 76 is ready to gather the item information the user has requested. If the item information has been properly cached by the local database 74, the base server 76 retrieves the item information from the local database 74, as described previously. However, if the information pertaining to the selected item(s) is not cached in the local database 74, has not been re-cached within the caching time limit, or the user initiates a user override, the base server 76 performs the "live shopping" method (step 150) illustrated in FIG. 2 discussed in detail hereinabove, and generally designated by the reference numeral 150 in FIG. 6.

Figure 6:
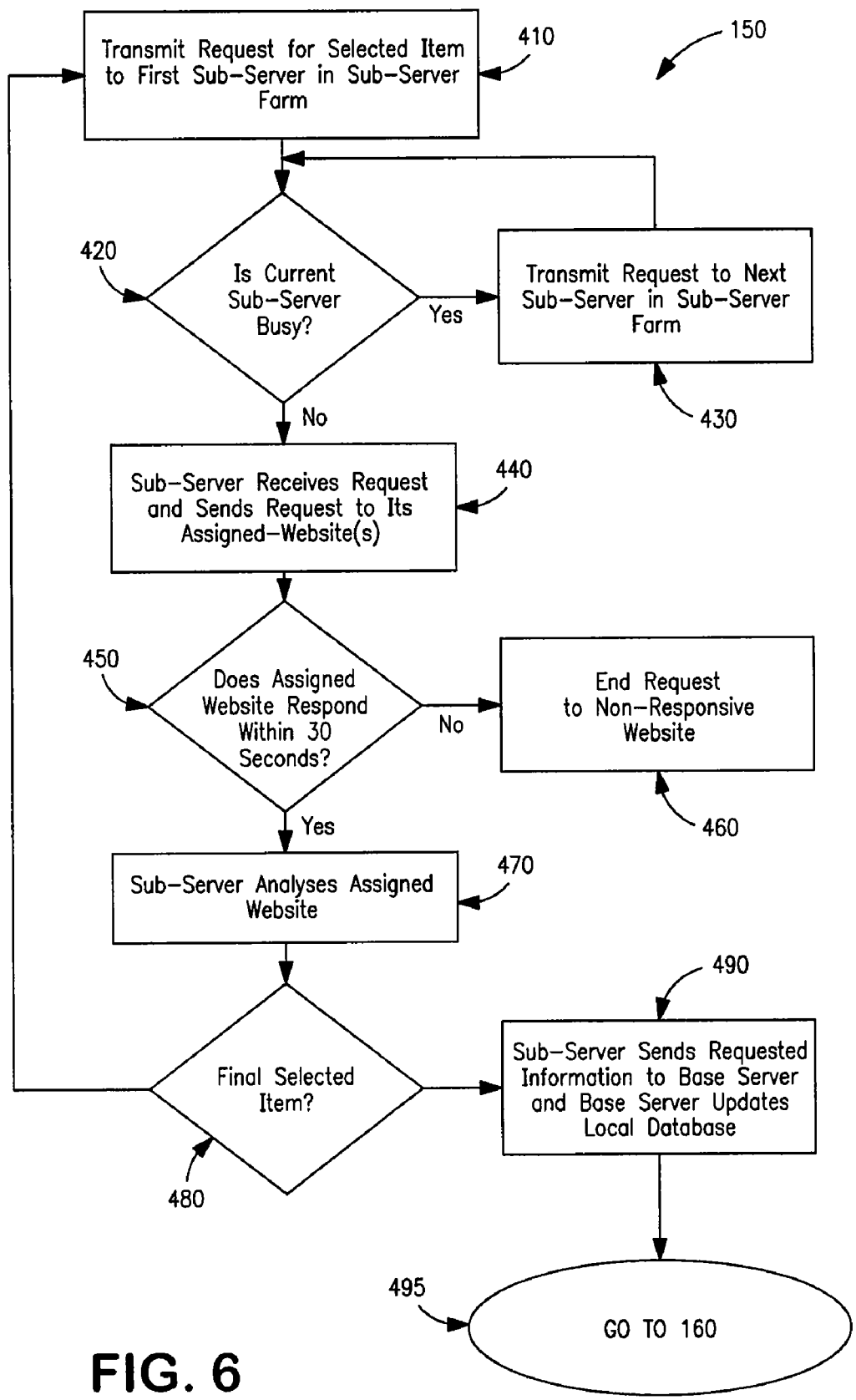
FIG. 6 is a flowchart describing a method for performing "live shopping" of e-commerce websites over the Internet.

The "live shopping" method 150, as illustrated in more detail in FIG. 6, preferably includes: transmitting a search request for the selected item information to the first sub-server 79 in the sub-server farm 78 (step 410); determining whether the current sub-server 79 is busy, (step 420); if the current sub-server 79 is busy, transmitting the search request to the next sub-server 79 in the sub-server farm (step 430); if the current sub-server 79 is not busy in step 420, the sub-server 79 receiving the search request sends the search request to its assigned e-commerce website(s) 59 (step 440); determining whether an assigned e-commerce website 59 responds to the search request within 30 seconds (step 450); if an assigned e-commerce website 59 does not respond to the search request within 30 seconds, terminating the search request to the non-responsive e-commerce website 59 (step 460); if an assigned e-commerce website 59 does respond to the search request within 30 seconds, the sub-server 79 analyzes the assigned e-commerce website 59 (step 470); determining whether information pertaining to the final selected item has been retrieved (step 480); if the information for the final selected item has been retrieved, the sub-server sends the requested information back to the base server 76 and the base server 76 updates the local database 74 (step 490); and the process then returns to the main method 100 of FIG. 2 (step 495).

In other words, the base server 76 transmits 410 the search request for information pertaining to the selected item(s) to the sub-server farm 78, which delivers the request to the first sub-server 79. If that particular sub-server 79 is busy handling a previous request 420, the search request is transmitted 430 to the next sub-server 79 in the sub-server farm 78. If that sub-server 79 is busy, the next sub-server 79 is sent the search request, and so on, until a suitably non-stressed sub-server 79 can handle the search request. Ideally, the process of finding an available sub-server 79 should only take a few 100ths of a second.

The available sub-server(s) 79 receives 440 the search request and sends the search request to the sub-server's 79 assigned e-commerce website(s) 59. It should, of course, be understood that more than one sub-server 79 can be used to process a particular search request and a particular sub-server 79 can be assigned to more than one e-commerce website 59. For example, with reference now to FIG. 7, there is illustrated a preferred process, generally designated therein by the reference numeral 440, for multiple sub-servers 79A-79E transmitting simultaneous, multi-threaded requests to assigned website(s) 59A-59G, as illustrated therein by the arrows. The sub-server(s) 79 use a search function to address and check each assigned e-commerce website 59. This function allows the sub-server(s) 79 to dynamically create an e-commerce website's URL that takes the sub-server(s) 79 directly to the item information webpage of the e-commerce website 59.

Once the sub-server(s) 79 has sent the search request to the assigned e-commerce website(s), the sub-server(s) 79 keeps track of how long it takes a particular assigned e-commerce website 59 to respond to the search request (step 450). If an assigned e-commerce website 59 responds slowly, i.e., takes more than 30 seconds to response, or if the Internet itself is too congested, the sub-server(s) assumes that assigned e-commerce website is unavailable for searching and terminates (step 460) the search request to that particular assigned e-commerce website 59.

When an assigned e-commerce website 59 does respond to a search request, the sub-server(s) 79 analyses (step 470) the assigned e-commerce website 59. The sub-server(s) 79 analyses the assigned e-commerce website(s) 59 utilizing the e-commerce website's 59 HTML structure to determine the location of the requested information, e.g., the location of the price of the selected item. The sub-server(s) 79 then extracts the information from the assigned e-commerce website(s) 59. The sub-server(s) 79 then determines (step 480) whether information pertaining to the final selected item has been retrieved. If there are no more selected items for the sub-server(s) 79 to search for, the sub-server(s) 79 sends (step 490) the requested information back to the base server 76 and the base server 76 uses the information to update the local database 74 cache. "Live shopping" method 150 then returns (step 495) to the main method 100 shown in FIG. 2.

Displaying Search Results to the User

Once all the requested item information, e.g., price, promotional, comparative and other data, is retrieved from the local database 74 cache or is collected from all of the e-commerce websites 59, the base server 76 creates an HTML webpage that displays the item information to the user. Where the item information is price data, the display webpage can list the selected item(s), for example, in order from lowest price to highest price, thus enabling the user to more easily choose the best bargain. When the item information is promotional or comparative information, the display webpage describes the item in more detail and, for comparisons, contracts the item with similar items deemed related or affiliated, thereby enabling the user to better understand the item and similar items and make an informed decision.

Figure 8:
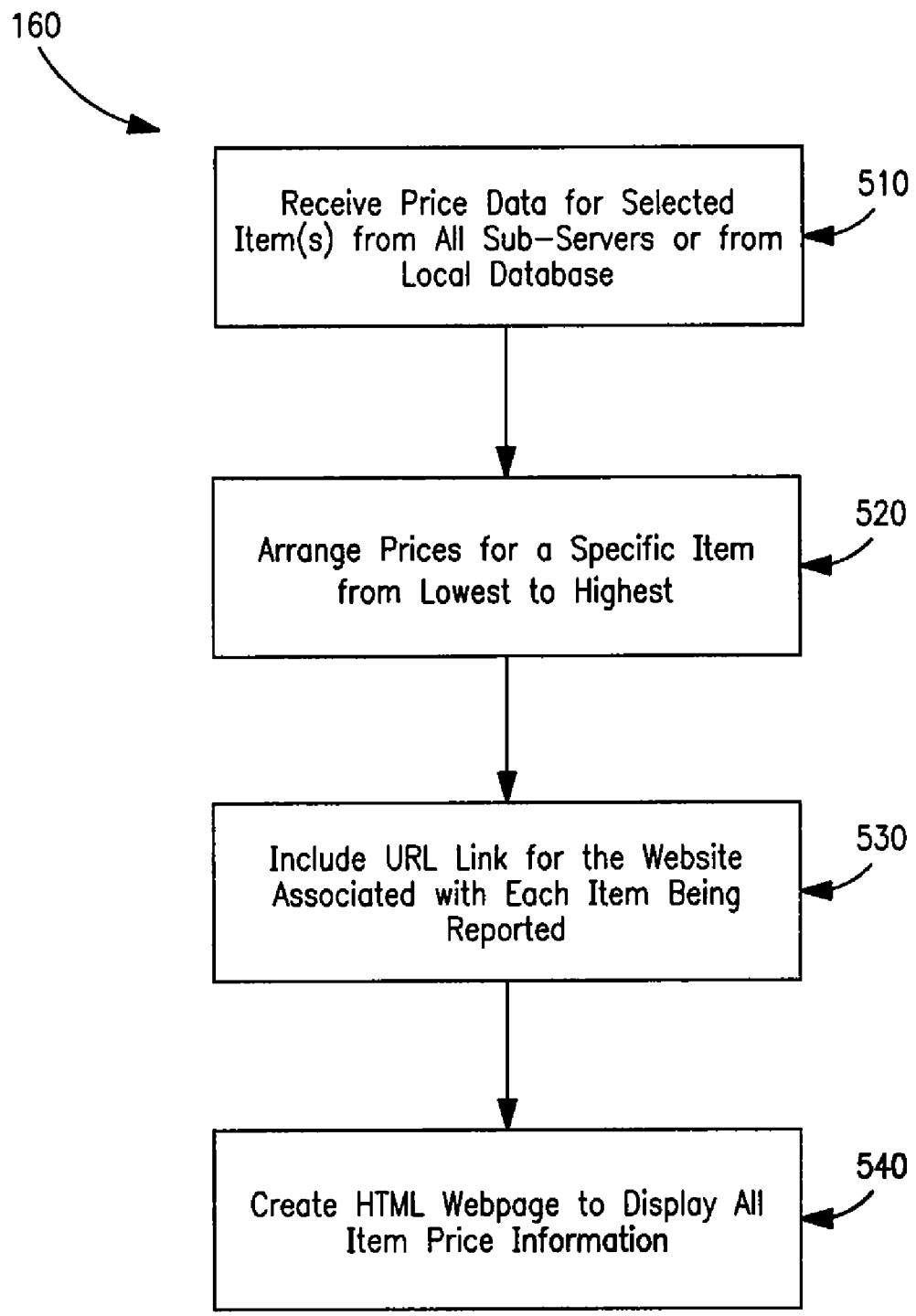
FIG. 8 is a flowchart describing a method for displaying search results to the user.

With reference now to FIG. 8, there is illustrated a display method, generally designated by the reference numeral 160 (FIG. 2), which preferably includes: receiving price, promotional, comparative or other data for the selected item(s) from all sub-servers 79 or from the local database 74 cache (step 510); arranging the prices for a specific selected item from lowest to highest or other arrangements for promotional and comparative data (step 520); including the URL link for the e-commerce website 59 associated with each item being reported (step 530); and creating an HTML webpage to display all of the item price information (step 540).

After the base server 76 has retrieved (step 510) the price or other data from either the local database 74 cache or from the sub-server farm 78, the base server arranges (step 520) the price data. Preferably the price data for the selected item(s) is arranged from lowest to highest since the user will usually be most interested in find the lowest possible price for the selected item(s). However, other arrangements are of course possible. For example, the price data could be arranged from highest price to lowest price or the price data could be arranged alphabetically according to the name of the e-commerce website 59 from which the price data was garnered. As indicated, promotional, comparative and other information can be arranged in other formats conducive to that usage.

Once the item information has been arranged, the base server 76 includes 530 the URL link for the e-commerce website(s) 59 associated with the particular item information for each item being reported. Therefore, if the user decides to purchase a particular item based on the reported information, the user simply has to select the URL for that e-commerce website 59 and will be taken directly to the correct screen of the e-commerce website 59 for purchasing the item.

The base server 76 reports the requested information by creating (step 540) an HTML webpage, or alternatively a webpage in XML or some other suitable language, to display all of the item information. With reference now to FIG. 9, there is illustrated a preferred price results webpage, generally designated by the reference numeral 1200. The price results webpage 1200 can include an item field 1210, an ordered price search results list 1220, a hypertext link 1230 to an e-commerce website 59, a time of last update field 1240, the aforementioned user override activation button 1250, and a return to query page button 1260.

As shown in FIG. 9, the item field 1210 displays the item name, in this example the book title, of the selected item. The ordered price search results list 1220 displays the list of the e-commerce website(s) 59 that sell the selected item, the price of the item at a particular e-commerce website 59 (arranged in this example from lowest to highest), the shipping cost of the item from the particular e-tailor, and the total price. The display of the e-commerce website 59 is shown as a hypertext link 1230 which enables the user to connect directly to that e-commerce website 59 if the user decides to purchase the selected item from that e-commerce website 59. The ordered price search results list 1220 can also include a time of last update field 1240, which displays to the user how long it has been since the local database 74 cache was last updated with that particular item information from that particular e-commerce website 59.

The price results webpage 1200 of FIG. 9 can, as illustrated, also include a user override activation button 1250. The user override activation button 1250 allows the user to initiate a new "live shopping" search of the e-commerce website(s) regardless of how recently the item information has last been cached in the local database 74. This can be useful if a user wants the latest up-to-date price information on a item. Finally, the return to query page button 1260 allows the user to return to the user interface webpage 1000 (see FIG. 3) to begin a new user query.

E. Bulk-Shopping

Figure 10:
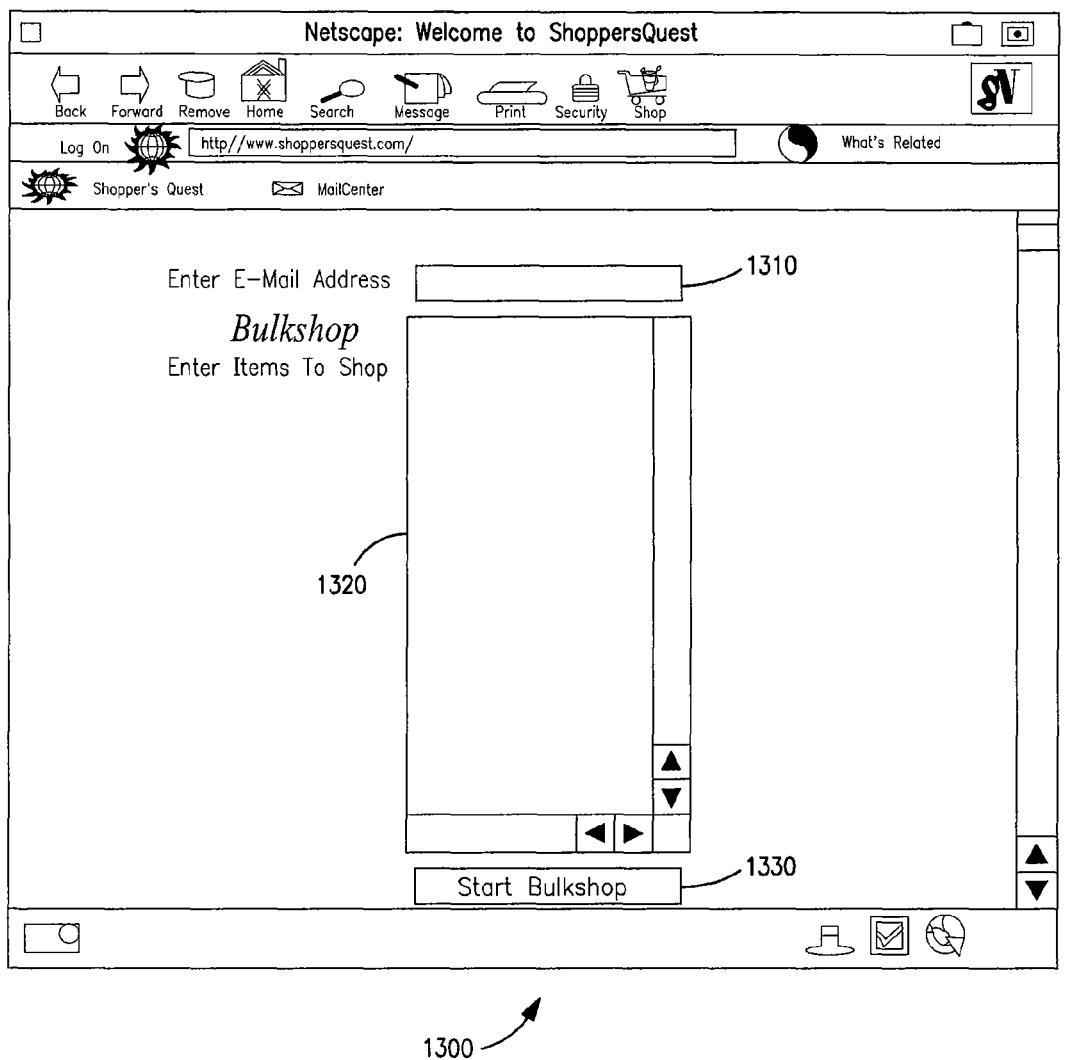
FIG. 10 is an illustration of a webpage interface for accepting a user bulk-shop query.

In some instances, a user may wish to search for item information for many items at once rather than entering one item at a time using user interface webpage 1000. With reference now to FIG. 10, there is illustrated a bulk-shopper interface webpage, generally designated by the reference numeral 1300. The bulk-shopper interface webpage 1300 preferably includes a user e-mail address entry window 1310, an item selection window 1320, and a bulk-shopper activate button 1330.

In operation, the user types in an e-mail address into the user e-mail address entry window 1310. This will be the e-mail address to which a search report will be delivered. The user then can drag or paste in as many items as the user wishes to find information for, i.e., several hundred or several thousands of item identification numbers (ISBN for books, UPC for music, etc.). As the bulk-shopper function will most likely be used by retailers rather than casual consumers, the user retailer will have easy access to the proper item identification numbers. The user then selects the bulk-shopper activate button 1330 to initiate the search. The search procedure is identical to method 100 as described above. The only difference is how the search report is delivered.

Figure 11:
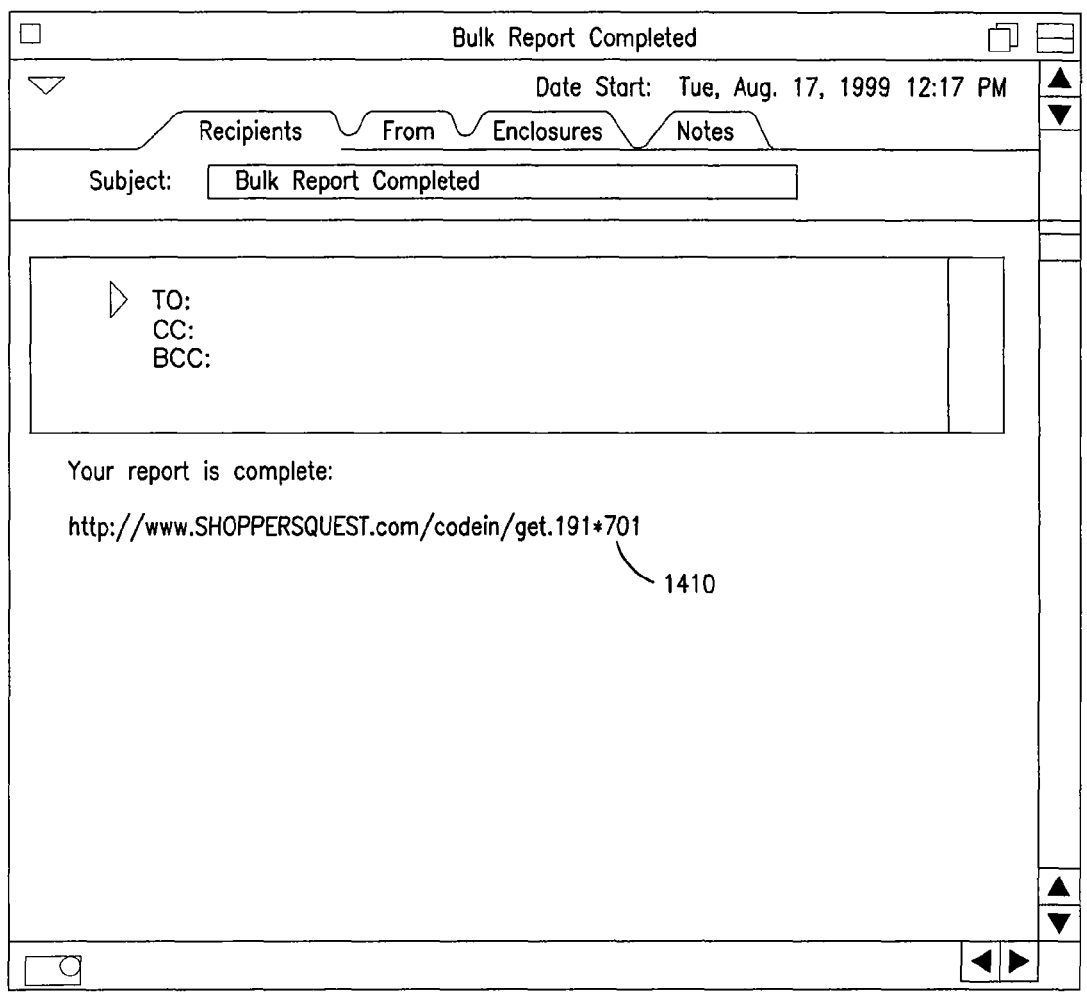
FIG. 11 is an illustration of an e-mail reporting the results of a bulk-shop request.

When the base server 76 has finished retrieving the item information from the local database 74 cache or from the sub-server farm 78, it will send the user a bulk-shop results e-mail 1400, as illustrated in FIG. 11. The bulk-shop results e-mail, generally designated by the reference numeral 1400, includes a link 1410 therein to the aforementioned price results webpage 1200. In this situation, the price results webpage 1300 will be laid out as a spreadsheet displaying the shopping results, complete with shipping information, hypertext links 1230 to the e-commerce websites, and time of last update fields 1240. The price results webpage 1200 is sent to the user in the bulk-shop results e-mail 1400 because it may take the base server 76 some time to process the user's entire query. Sending the link in an e-mail prevents the user from having to sit at his or her computer waiting for the search results to be displayed. The user can instead click on the link 1410 to the price results webpage 1400 at his or her leisure.

In an alternative embodiment, the base server 76 can keep a webpage active with the user's current "cart" of queried items. Users can monitor prices or other information on a variety of items on their own personalized shopping page. The information on these pages are updated automatically every evening or alternatively at an update rate specified by the user, i.e., by using the override button 1250 (FIG. 9).

F. Shopping News and Promotional Information

As intelligent agents like "bots" become more and more prevalent on the Internet, consumers begin to distance themselves from content on e-commerce websites, relying on the automatic agent to do most of their trivial or mundane searching for them. The operation of the interactive shopping system 30 (FIG. 1) described above falls into this category, enabling a user to comparison shop the entire Internet within a few seconds.

This, however, misses the point of content-rich e-commerce websites. The goal of these e-commerce websites is to not only offer competitive prices but to also offer interesting and informative content to engage shoppers, keep them at the e-commerce website longer than at a competitor's website, and to compel the shoppers to return again and again. Since the purpose of interactive shopping system 30 is to offer a fundamentally holistic tool to aid the shopper's experience on the Internet and ease the overwhelming burden of information available to users, the interactive shopping system 30 must not only contain a tool to divine competitive prices but the interactive shopping system 30 must also contain a tool to aggregate and sort through the variety of interesting and compelling e-commerce content.

When the user wishes to retrieve and view shopping news or promotional information, the user can select the shopping news/promotional information request button 1012, from the user interface website 1000 (FIG. 3), for example. The base server can then retrieve the shopping news and promotional information (hereinafter "promotional information") preferably using one of three methods: information scraping, information sharing, or information input. Each of these method fits within the overall framework of method 100 with modifications to the perform "live shopping" step 150 and the display results to user step 160.

1. Information Scraping

Figure 12:
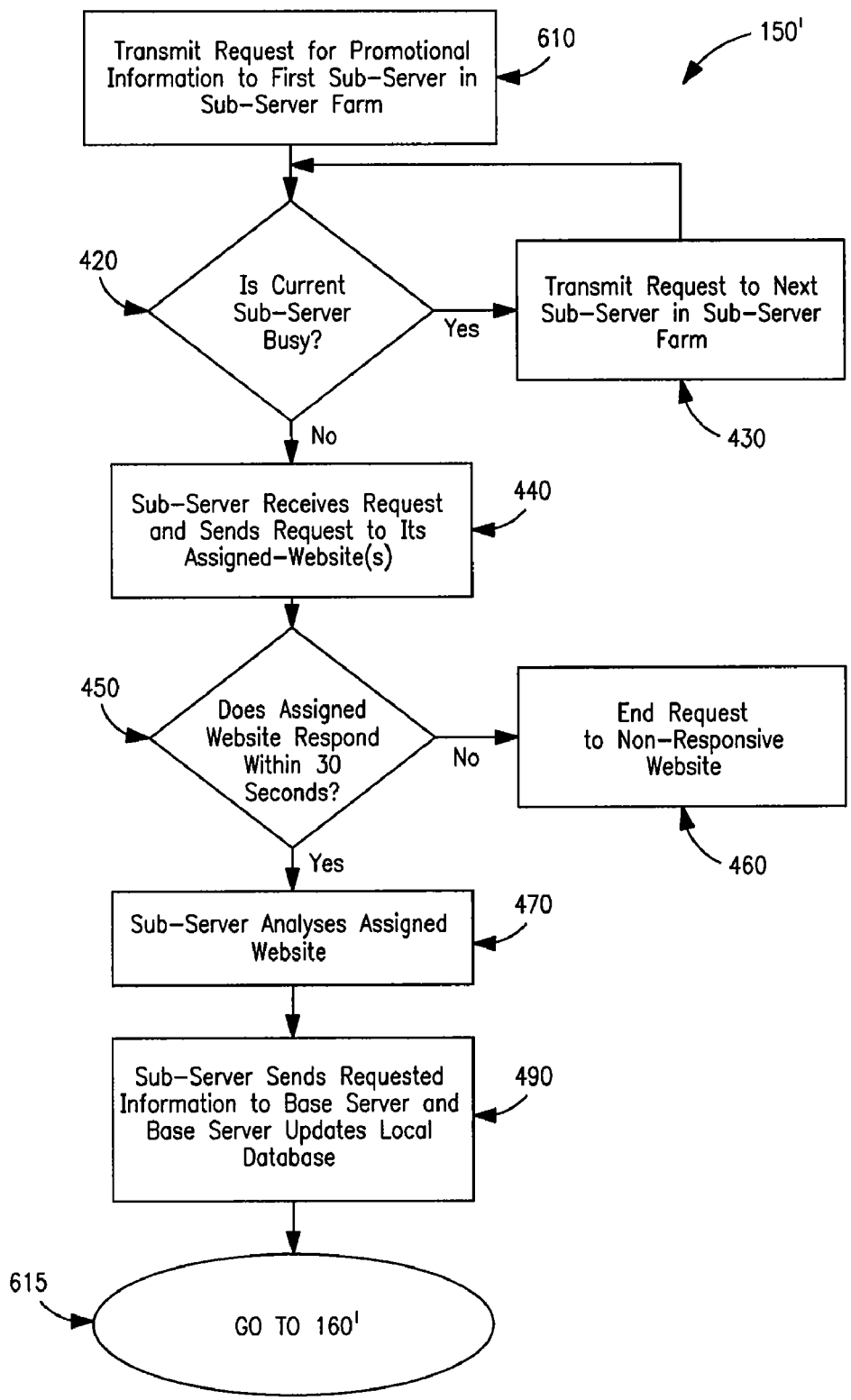
FIG. 12 is a flowchart describing a method for searching e-commerce websites for promotional information over the Internet.

With reference now to FIG. 12 of the Drawings, there is illustrated a flowchart for an information scraping method, generally designated therein by the reference numeral 150'. The information scraping method 150' preferably includes the steps utilized in the aforementioned "live shopping" method 150, with the addition of transmitting a search request for promotional information (step 610) in place of transmitting a search request for selected item information (step 410). Also, the information scraping method 150' goes to modified display method 160' in step 615 rather than to the display method 160, which was described above.

The base server 76 gathers promotional information using the information scraping method 150' in a similar manner to how the base server 76 retrieves item information in "live shopping" method 150. The base server 76 transmits 610 the search request for promotional information to the sub-server farm 78. Once at least one suitably non-stressed sub-server(s) 79 is found, steps 420 and 430, the sub-server(s) 79 receives (step 440) the search request and sends the request to the assigned e-commerce website(s) 59 in the multi-threaded manner illustrated in FIG. 7. The sub-server(s) 79 determines (step 450) whether the assigned e-commerce website(s) 59 is responding to the search request and terminates (step 460) the search request to any assigned e-commerce website that does not respond within 30 seconds. The sub-server(s) 79 analyze (step 470) the assigned e-commerce website(s) 59 that does respond to the search request within the 30 second time limit, retrieves the requested promotional information, and sends (step 490) the requested promotional information to the base server 76 which in turn updates the local database 74 cache with the requested promotional information.

Figure 13:
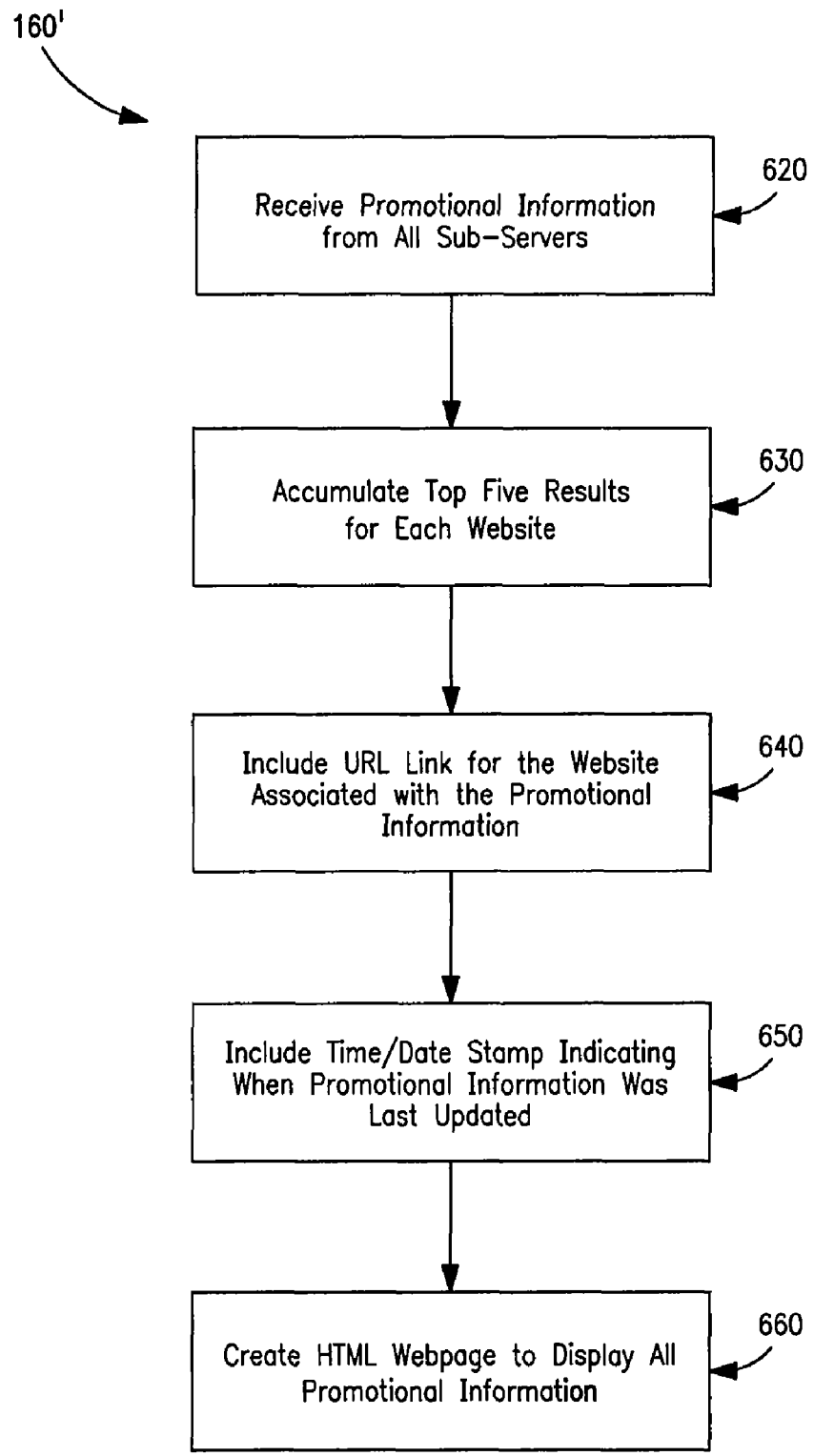
FIG. 13 is a flowchart describing an alternative method for displaying search results to the user.

With reference now to FIG. 13, there is illustrated a flowchart for a modified display method, generally designated therein by reference numeral 160', which can be used to display promotional information retrieved by the aforementioned information scrapping method 150'. Modified display method 160' can also be used to display promotional information retrieved by the information sharing and information input method, which will be described below.

Modified display method 160' preferably includes receiving the retrieved promotional information from the sub-server farm 78 (step 620), accumulating the top five results for each e-commerce website 59 (step 630), including the URL link for the e-commerce website 59 associated with a particular piece of promotional information 640, including a time/date stamp indicating when the promotional information was last updated 650, and creating an HTML webpage to display the promotional information 660.

Once the base server 76 receives 620 the retrieved promotional information from the sub-server farm 78, the base server accumulates 630 the top five results for each e-commerce website 59, based on either the time the promotional information was acquired or in order of importance as specified by the e-commerce website operators. The number of results, for example five, is completely arbitrary and may be set at any number. The purpose of limiting the number of results displayed from each e-commerce website 59 is to organize and catalog the content of the e-commerce website(s) 59 into a manageable distillation. By minimizing the load of information a user sees, the user can increase the amount of information he or she can view while retaining the ability of delving deeper into the content at will.

The base server 76 then includes (step 640) the URL link of the e-commerce website 59 associated with the promotional information. The URL link allows the user to easily access the pertinent e-commerce website 59 if the user wishes to see more information than is displayed by the base server 76. The base server 76 also includes (step 650) a time/date stamp indicating when the promotional information associated with a particular e-commerce website 59 was last updated. It is not necessary for base server 76 to update promotional information as often as it updates price information. Therefore, it is important to indicate to the user that the news he or she is viewing may be several hours or even a day or more old.

Figure 14:
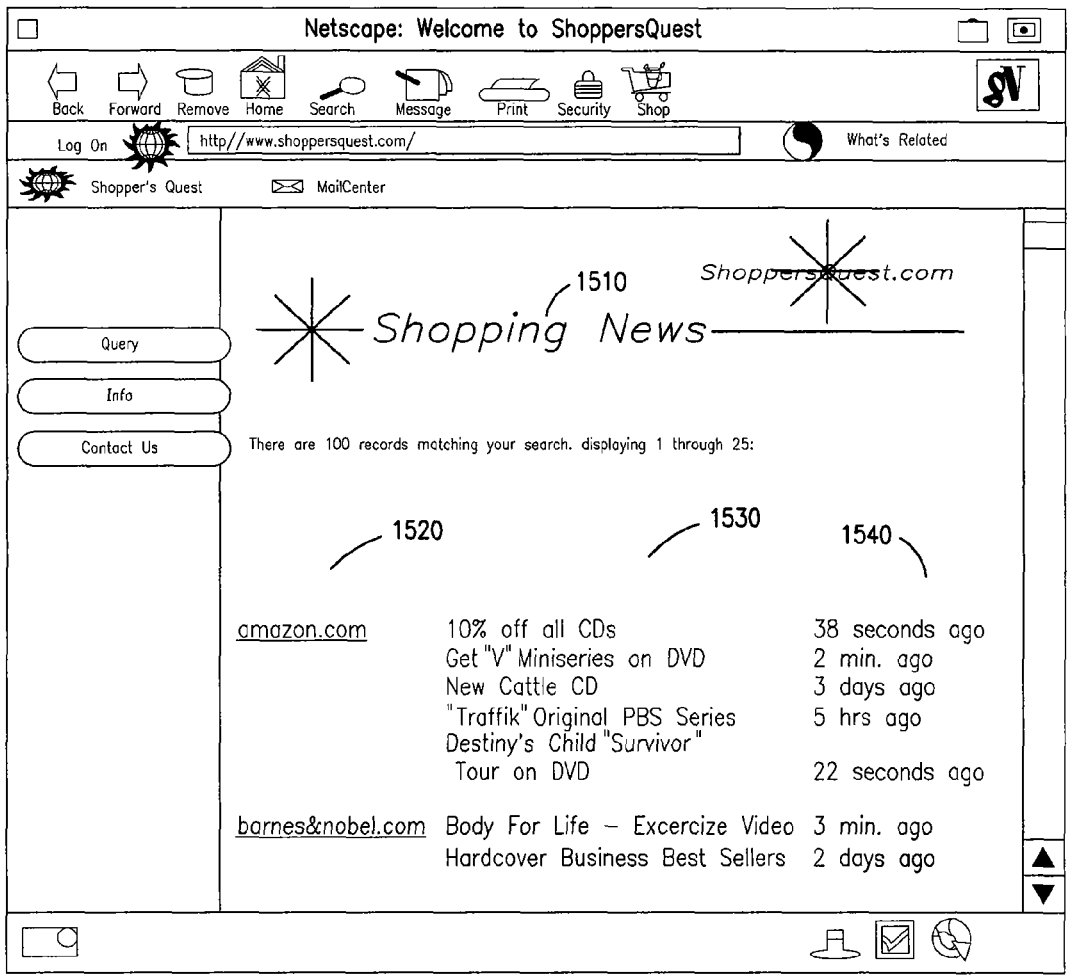
FIG. 14 is an illustration of a webpage displaying promotional information search results.

Finally, the base server creates (step 660) an HTML webpage, or alternatively a webpage in XML or some other suitable language, to display all of the promotional information. With reference now to FIG. 14, there is illustrated a preferred promotional information webpage, generally designated by the reference numeral 1500. The promotional information webpage 1500 may include a logo 1510, a hypertext link 1520 to the e-commerce website 59 associated with the specific promotional information, a list of promotional information 1530, and a time of last update field 1540, as well as features typical to all of the webpages, i.e., the aforementioned service information button 1014, the contact information button 1016, and the query request button 1160. The hypertext link 1520 allows the user to go directly to the e-commerce website 59 associated with the particular promotional information the user is interest in. As mentioned previously, the time of last update field 1540 indicates to the user how much time has past since the information displayed in the list of promotional information 1530 was last re-cached in the local database 74.

2. Information Sharing

Figure 15:
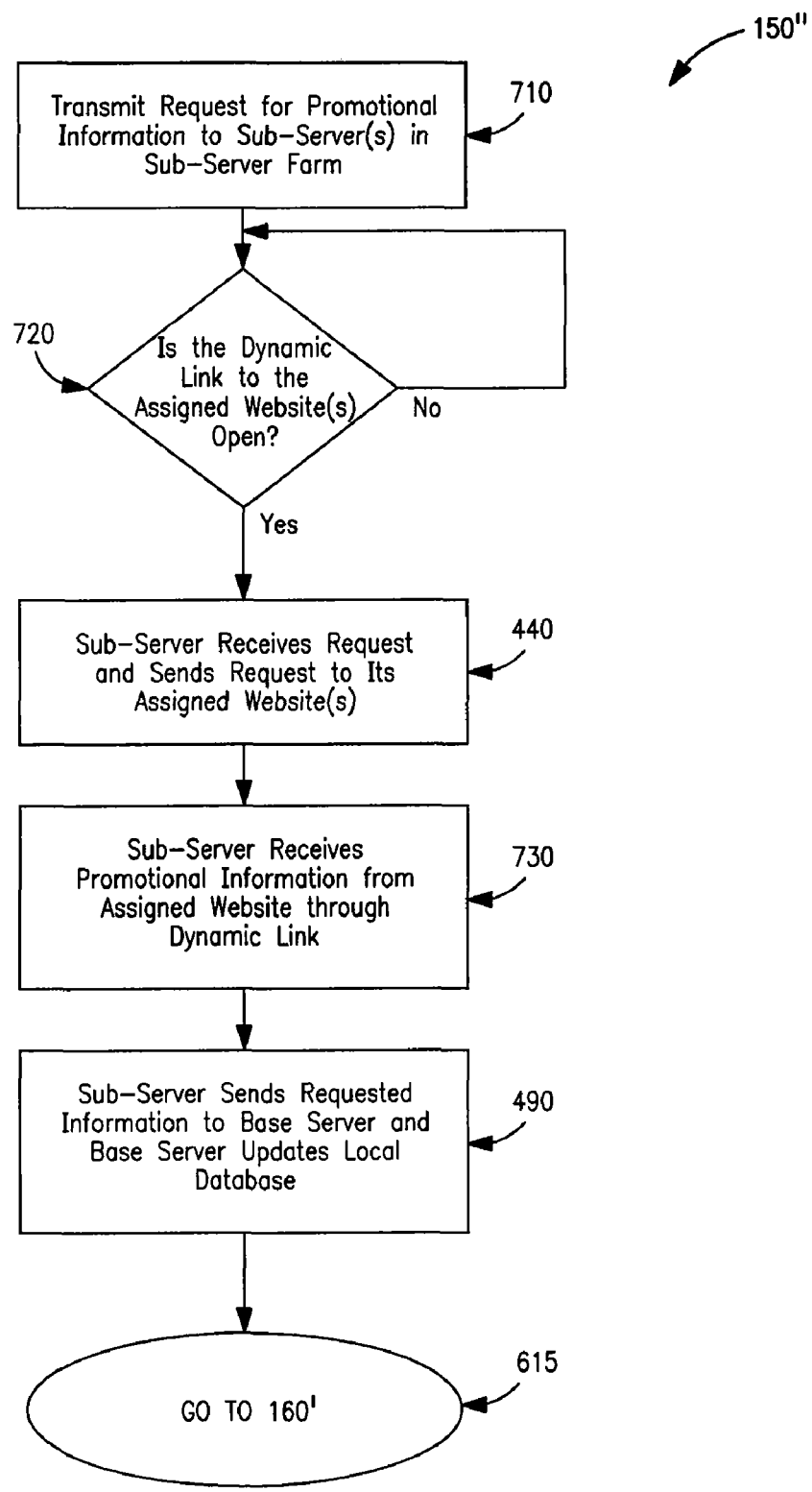
FIG. 15 is a flowchart describing an alternative method for searching e-commerce websites for promotional information over the Internet.

Information sharing is the interactive shopping system's 30 ability to dynamically update information from a direct data link to various e-commerce websites 59. This direct data link is open only at specific, agreed upon times when the sub-server farm 78 has the authority to query a foreign e-commerce website 59 directly. With reference to FIG. 15, there is illustrated a flowchart for an information sharing method, generally designated therein by the reference numeral 150". Information sharing method 150", which is another modification of "live shopping method" 150, and preferably including: transmitting a request for promotional information (step 710); determining whether the dynamic data link to an assigned e-commerce website 59 is open (step 720); the sub-server(s) 79 receiving the request for promotional information and sending the request to the assigned e-commerce website 59 (step 440 in FIG. 6); the sub-server(s) 79 receiving the promotional information through the dynamic data link (step 730); the sub-server(s) 79 sending the requested promotional information to the base server 76, which, in turn, updates the local database 74 cache with the retrieved promotional information (step 490); and going to the aforementioned modified display method 160' (step 615).

Once the base server 76 transmits (step 710) the request for promotional information to the sub-server farm 78, the sub-server 78 determines (step 720) whether the dynamic link to the assigned e-commerce website(s) is open. When the dynamic link opens at the specified, agreed upon time, the sub-server(s) 79 receive (step 440) the request for promotional information and sends the request to the assigned website(s) 59. The sub-server(s) 79 receive the promotional information from the various assigned e-commerce websites 79 through the dynamic data link. The dynamic data link can be maintained through a variety of methods that are built into the interactive shopping system 30, including HTML links, XML queries, or other methodologies that a partner e-commerce website recommends, as are understood in the art.

Once the information is received, the sub-server farm 78 sends (step 490) the requested promotional information to the base server 76 which then updates the local database 74 with the retrieved promotional information. The base server then displays the promotional information using the aforementioned modified display method 160', described in more detail hereinabove.

3. Information Input

In the information input methodology, a partner e-commerce website has a secure data entry area, accessible by the sub-server farm 78, where the e-commerce website operators can type in as much contextual or information rich data as they would prefer. With this methodology, minimizing the amount of information that reaches the user becomes critical. Indeed, with the information input methodology, entire display webpages could be dedicated to just one partner e-commerce website. Although there is no limit to how much information the e-commerce website operators can enter, the base server 76 will continue to burrow through the information will limit the display of information as described previously.

Figure 16:
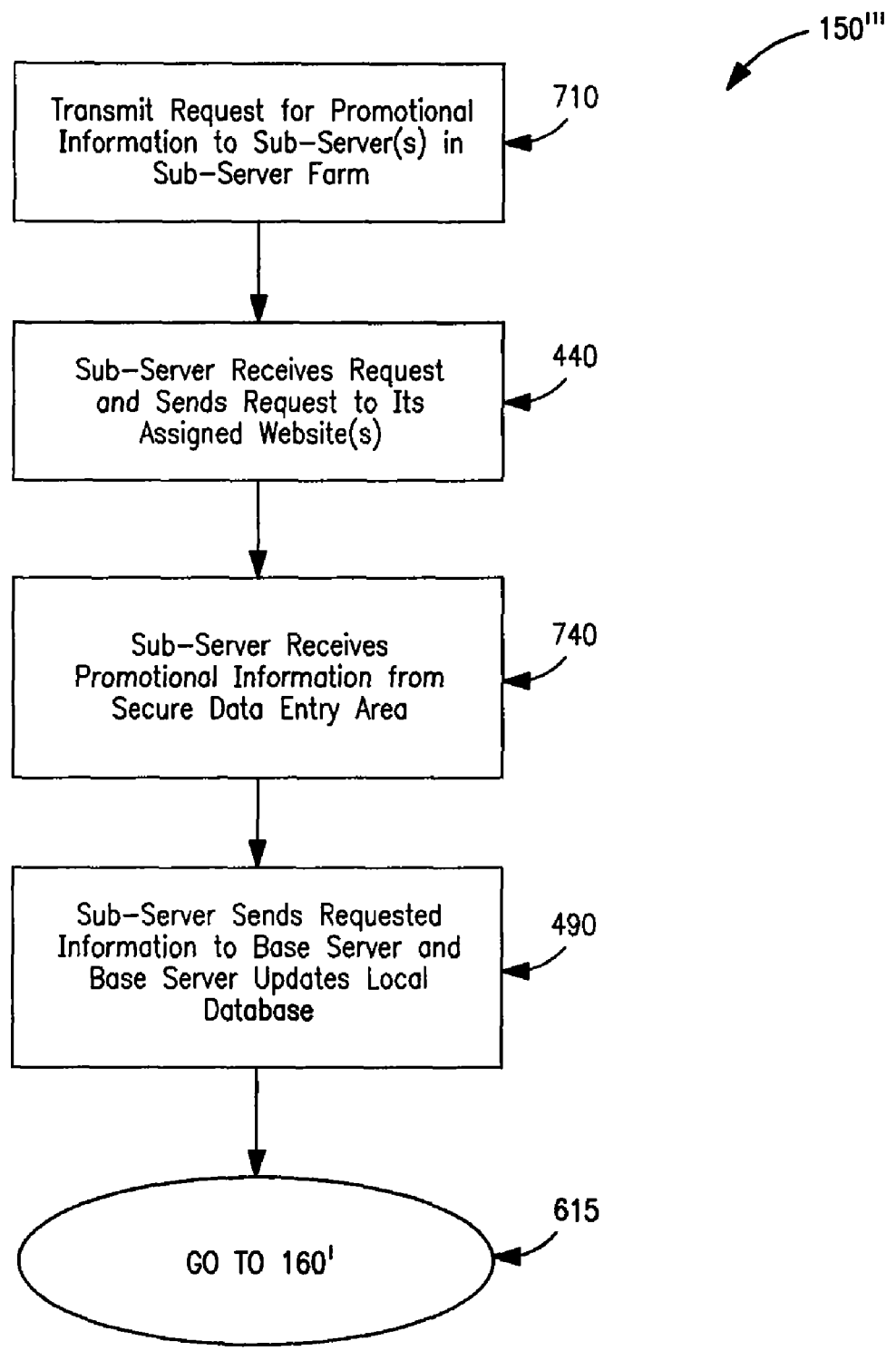
FIG. 16 is a flowchart describing an another alternative method for searching e-commerce websites for promotional information over the Internet.

With reference now to FIG. 16 of the Drawings, an information input method, generally designated by the reference numeral 150''', is a modified version of information sharing method 150" shown in FIG. 15. Although information input method 150''' includes many of the steps from information sharing method 150", it also includes the additional step of receiving promotional information from the secure data entry area (step 740), as opposed to receiving the promotional information through the dynamic data link (step 730). Furthermore, there is also no need to wait for the secure data entry area to open (see step 720 in FIG. 15). E-commerce website operators can enter data into the secure data entry area at will. The information is retrieved (step 740) by the sub-server(s) 79 whenever a user requests promotional information using the shopping news/promotional information request button 1012 (FIG. 3). Finally, the information retrieved using information input method 150" can be displayed to the user using modified display method 160', as described above.

G. Item Identification Verification and Correction

There are times that searching for item information on various e-commerce websites is difficult because of the unique numbering systems these e-commerce websites have implemented. By breaking with industry standardized numbering schemes, these e-commerce websites have, in effect, become nearly impossible to search for item information. Usually, this is not intentionally done, for instance, to prevent intelligent agents such as sub-servers 79 from visiting the e-commerce websites. Rather its typically an embrace of either a proprietary identification scheme that the e-commerce website has inherited from leasing a third-party legacy database or a compromise between fitting a new data model into an old, concrete data framework (for example, fitting in 12 digit UPC numbers into the data scheme for 10 digit ISBN numbers).

However, in order to work effectively, the aforementioned interactive shopping system 30 relies on specific and verifiable numbering schemes that are related to an item's title and/or description. Giving a user prices on an item that might exist in different incarnations on different e-commerce websites is useless. For example, *The Sirens of Titan* exists in hardback, paperback, quality paperback, large print, and as a book on cassette. Searching merely for the prices of the title, *The Sirens of Titan*, will return a conglomeration of prices for each of these formats. This is contrary to the overall philosophy behind the interactive shopping system 30, which is to offer information that users can easily understand and about which they can quickly make judgments.

Figure 17:
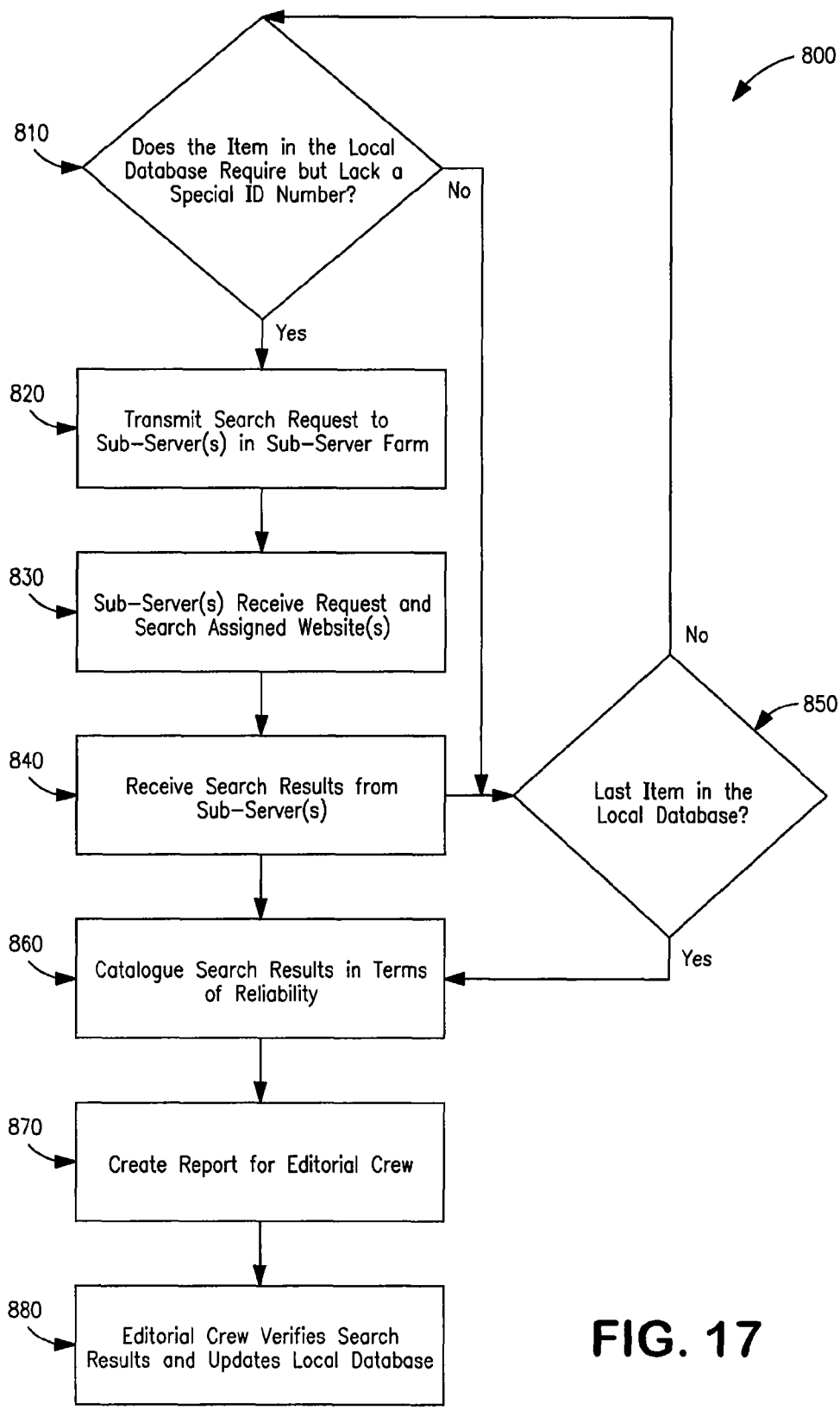
FIG. 17 is a flowchart describing a method for verifying and correcting item information in a local database.

In order to prevent this type of problem, correct item identification information must be maintained in the local database 74. With reference now to FIG. 17 of the Drawings, there is shown a flowchart for a method for verifying and correcting item information in the local database 74, the method generally indicated by the reference numeral 800. Correction method 800 preferably includes: determining whether an item in the local database 74 requires but lacks a unique identification number (step 810); if such an item exists in the local database 74, transmitting a search request to the sub-server farm 78 (step 820); the sub-server farm 78 receiving the search request and searching the assigned e-commerce website(s) for the requested information (step 830); receiving the search results from the sub-server farm 78 (step 840); determining whether the last item in the local database 74 has been checked for correct identification information (step 850); cataloguing the search results in terms of reliability (step 860); creating a report for an editorial crew (step 870); and the editorial crew verifying the search results and updating the local database 74 with the correct item identification information (step 880).

The base server 76 continually queries (step 810) the local database 74, asking whether there are any items in the local database 74, that require but lack special or unique identification numbers that are generated by specific e-commerce websites 59. For example, a CD of Christmas carols has a known UPC of 333333333333. That data is enough for the sub-server farm 78 to comparison shop most music e-commerce websites on the Internet. However, two e-commerce websites are exceptional in that items sold on the e-commerce websites are required to have unique ID numbers.

If there are no items listed in the local database 74 that require generation of specific numbers, the base server 76 notes that the checked item(s) has a complete descriptive identification number data set. If, however, the local database 74 reports that any items are missing a specific identification number, the base server 76 transmits (step 820) a request to the sub-server farm 78 to search all the assigned e-commerce websites 59 for the missing identification information.

The sub-server(s) 79 receive 830 the search request and search the assigned e-commerce website(s) 59 based on the descriptive information relating to the item, i.e., the title, author, artist, creator, manufacturer, or other descriptive criteria. In our previous example of the Christmas CD, the sub-server(s) 79 use the CD title, the artist or artists, soloists, date of production and performance, image, description, and any other important information to search the assigned e-commerce website(s) 59. If the assigned e-commerce website 59 being searched has a more robust search engine, the sub-server(s) 79 can take advantage of the search engine to help narrow the search. Of course, the entire reason that the interactive shopping system 30 does not use descriptive information to gather price data is because this method is fraught with delays and misinterpretation. To overcome these limitations, the correction method 800 relies heavily on reporting the search findings to an editorial crew.

Once the base server 76 receives the search results from the sub-server farm 78, and the base server determines (step 850) that the last item in the local database has been checked, the base server catalogues (step 860) the search results in terms of the reliability of the search results and creates (step 870) a nightly report for the editorial crew. The base server's 76 reliability index takes the form of recommendations to the editorial crew. Using the previous example of the Christmas CD, the sub-server farm 78 searches (step 830) the two specific e-commerce websites for further information on the Christmas CD. The sub-server(s) 79 search first by title and then (of if allowed simultaneously) by artist. If the search results come back with one specific item "hit" or resolution to the query, the odds of a successful match are extremely high. The sub-server(s) 79 pull up the specific item detail page and match description to description, track list to track list, annotation to annotation, and format to format to verify that this item matches the item in the local database 74. If there is no question that both items are exact matches, the sub-server(s) extract 840 that item's unique ID number from the assigned e-commerce website 59, the base server 76 receives (step 840) the information, and updates (step 880) the local database 74 with the item identification information.

If, however, there is a question about the particular item, for example, not all of the tracks on the Christmas CD listed in the local database 74 match up with the tracks of the Christmas CD sold by the e-commerce website, the sub-server(s) 79 compare as much information as possible during the search (step 830) and, using an intelligent parsing algorithm determines the percentage chance that the two items are similar. The intelligent parsing algorithm first attempts to match UPC, ISBN, or some other standard number code between the item listed in the local database 74 and the item on the e-commerce website. If there is no match, the algorithm tries next to match, for example, title and author, or any other descriptive information (e.g., product name and description, manufacturer, etc.). The base server 76 then receives (step 840) this percentage from the sub-server farm 78 and creates (step 870) a report including the reliability information for retrieval by the editorial crew. The report may be in the form of a secure webpage (not shown).

When the editorial crew, which may be a human crew or some intelligent algorithm, begins verification analysis (step 880) of the report, it sees a list of successful and possible matches. Each item that the sub-server farm 78 searched for is categorized from 100% *Match to No Match Found*. Each match, possible match, or non-match has the title information, standard industry identification number, and the probable link to the e-commerce websites 59 that sell the disputed item. The editorial crew then checks the low reliability links and determines whether these low reliability e-commerce websites are or are not associated with the correct item. If the e-commerce websites do sell the same item that is stored in the local database 74, the editorial crew updates (step 880) the local database 74 with the appropriate unique number, which the sub-server(s) 79 can use later when searching for item information.

H. Aggregating and Displaying Product Information

An alternate embodiment of the present invention is directed to aggregating product information and displaying that information in a useable format to a sales representative or an end consumer.

Such an embodiment, in essence, defines the "intelligent bot" as an agent that acquires, filters, and consolidates information from a vast pool of sources. A user can query the comparison information system, refine the query based on results, and then further refine that query to divine the necessary information.

This is particularly useful because many similar products exist in the marketplace with similar features, especially in the areas of televisions, camcorders, stereos, cameras, cell phones, mp3 players, and other products. Due to these similarities, there is a high risk of confusion to consumers and purchasers. Retailers and sellers benefit from having knowledgeable salespeople who have access to accurate information and product comparison.

Although there are common-place methods for searching out product information, such as box labels and in-store physical catalogs, drawing a comparison between similar or disparate products is more challenging. In the current embodiment, a retail salesperson may make a product information request by a variety of methods, including through a web page, with a mobile device, through a request to a phone service, or by a direct pervasive connection with an RFID reader device. A "mobile device" may be any of a cell phone, a land-line phone, a PDA, a laptop computer, an RFID reader, or other handheld device. The query may take different forms, including product model number, UPC number, RFID tagging information, and product description. Additional product information includes a QR-code, a traditional or proprietary barcode, or other tagging method. The response of aggregated information can come back to the user through a variety of methods including text message, HTML page or other web page, voice response system, email or fax.

Figure 18:
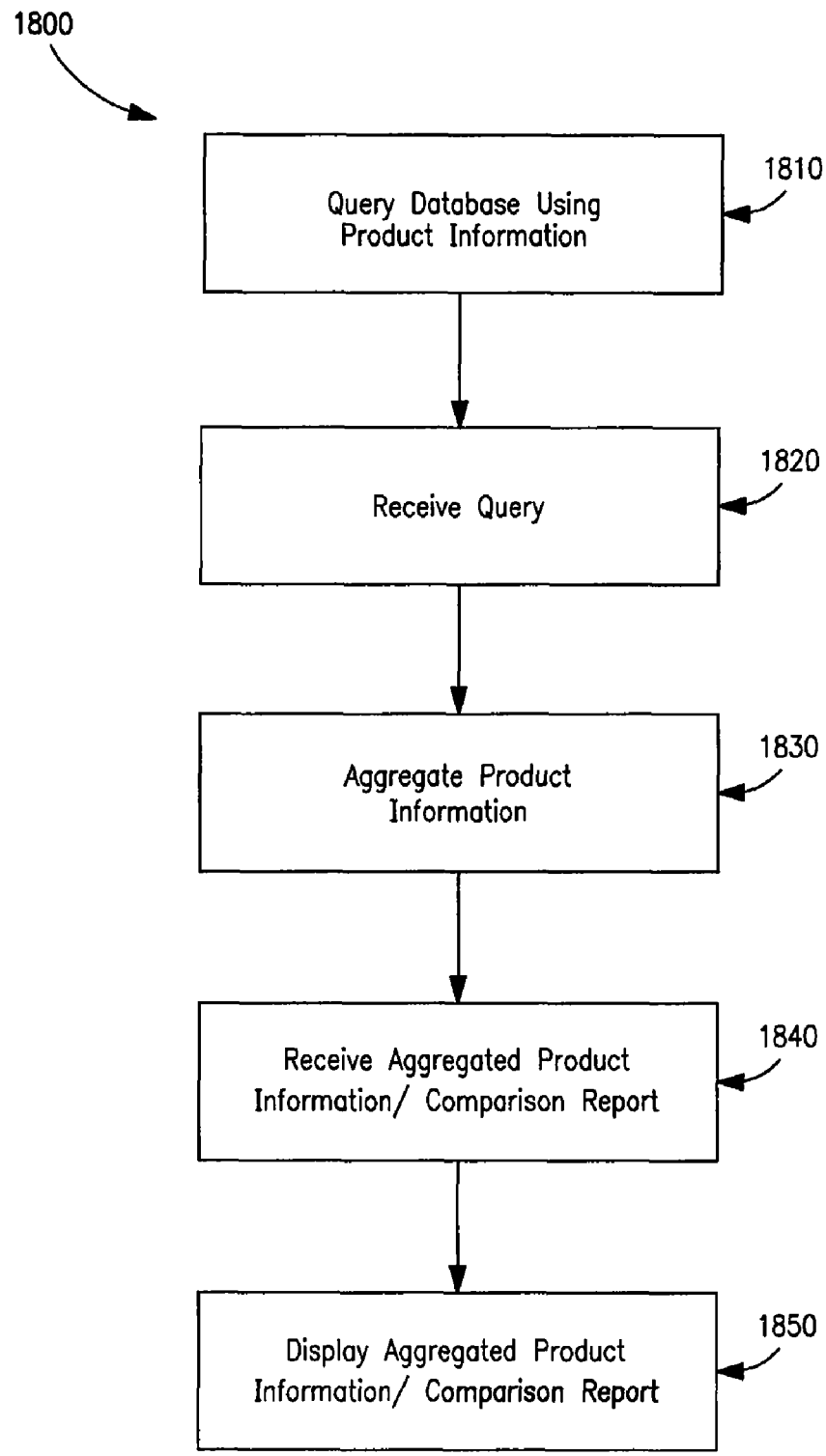
FIG. 18 a flowchart describing a method for aggregating product information and displaying that information in a useable format to a sales representative or an end consumer.

With reference now to FIG. 18 of the Drawings, there is illustrated therein a flowchart of a method, generally designated by the reference numeral 1800, for aggregating product information and displaying that information in a useable format to a sales representative or an end consumer. The method 1800 preferably includes querying a database using product information (step 1810); receiving, by the service, the query (step 1820); aggregating product information in response to the query (step 1830); receiving the aggregated product information or comparison report (step 1840); and displaying the aggregated product information or comparison report (step 1850).

The querying a database using product information (step 1810) preferably includes a user, who may be a retail salesperson or an end consumer, making a query for product information. The query can be the product model number of the product, usually found on the product or in a short product description. The query may be the UPC, usually found on packaging in a retail store or in a webpage short description. The UPC may be entered manually or may be scanned, using a barcode reader or a camera on a cell phone or other handheld device. In the case of a mobile device programmed to scan UPC codes using a camera, the user may either upload an image of the UPC code, or may use a program on the mobile device, programmed in Java or another language, that will scan the barcode by use of a preview horizontal scan line that helps the user align the barcode, and then read the barcode, using an algorithm, to determine the UPC number to be sent. The query may also be by RFID tag, or by product description. The user's mobile device or RFID reader may be enabled to read unencrypted RFID product information tags. The RFID tag of the product should broadcast that product's specific model number or other short product descriptor for the information service. If the query is by product description, the information may be detailed or general, according to the user's input. If the information is general, the service will make a "best guess" of the user's intent.

Receiving, by the service, the query (step 1820), preferably includes the submission of the query, which may be submitted using several methods. The query may be submitted through a web page or web interface, accessed by a mobile device or by any web service program, including a computer, an Internet television device, or other device. This method of submission can send a product number, a UPC number, an image of a UPC code, or a product description. The query may be submitted by a mobile device, which may be a cell phone, a PDA, or other handheld device. The query may be sent using a text message, containing a product model number, a UPC number, or a product description. Additionally, the query may be sent by uploading an image of the UPC using the mobile device's camera, sent by email, web service, or as a SMS message. If the mobile device is enabled to read UPC codes, the mobile device may be used to scan, using a camera or other device, the UPC code of a product and send the UPC number to the service. The query may be sent by a phone service, using a cell phone or landline, dialing an automated phone service to submit a product model, a UPC number, or product description. The phone service may also utilize voice recognition to analyze the user's request. The query may also be submitted using an RFID reader. The RFID reader may be enabled to have internet access, either using wireless internet or short-range wireless to a computer-server base station.

The aggregating product information in response to the query step 1805 preferably includes aggregating product information or creating a comparison report of two or more products. When the service receives a query from a user, the service checks a local database for product information, limited by the user's query, as described above. The process of information aggregation by the system is similar to the comparison shopping process described above, including crawling manufacturer websites for product information and receiving product information from suppliers and manufacturers through information sharing. This information sharing can come from the manufacturer as a data upload, direct data feed from a database, from a web service, or from a manual load of the information service's database from traditional analog sources such as informational pamphlets, product manuals, brochures, and other literature.

The receiving the aggregated product information or comparison report step 1840 and the displaying the aggregated product information or comparison report step 1850 is preferably dependent upon the report. When the service finds a match in the database, the service can send the user a synopsis or a full and detailed report. The service may determine the extent of the report depending upon various factors, including the user's preferences and rules related to the format of the query, i.e., for a query in the form of a text message, the size of the response message must be small and thus will have a short description of the product. Other reply formats include by web page, by text or instant message, by voice response system, including a phone message or an audio file located on a web page or in an email, by email, and by fax.

The user may query two or more similar products and receive a comparison report. For example, a user may evaluate three different cars at a car dealership or a used car lot. The information on each vehicle may be limited, so the user may use the comparison information service to obtain a comparison report of the three cars. The user may use the voice response system, where the user queries the system by placing a phone call and saying the make and model of each car into the phone. The user then has the option of receiving a text message with the comparison information or listening to the report over the phone. Alternatively, the voice system may have a navigation menu so that the user may receive the desired information. If the user is interested in gas mileage for four different cars, the user would call the service and, when the service requests the name of the general product, the user would specify "cars". Then the service narrows the search criteria by asking the user a series of pre-defined queries. In this example, the user would select "gas mileage". The service would then prompt the user for the make and model of the cars. When the user is finished, the service queries the user how the user desires the comparison results. The user may ask for a voice report. The service then proceeds with the back-end process to compare the product information on the cars and then, using its voice system, delivers the comparison report to the user by offering a comparison of the four cars' gas mileages.

Figure 19:
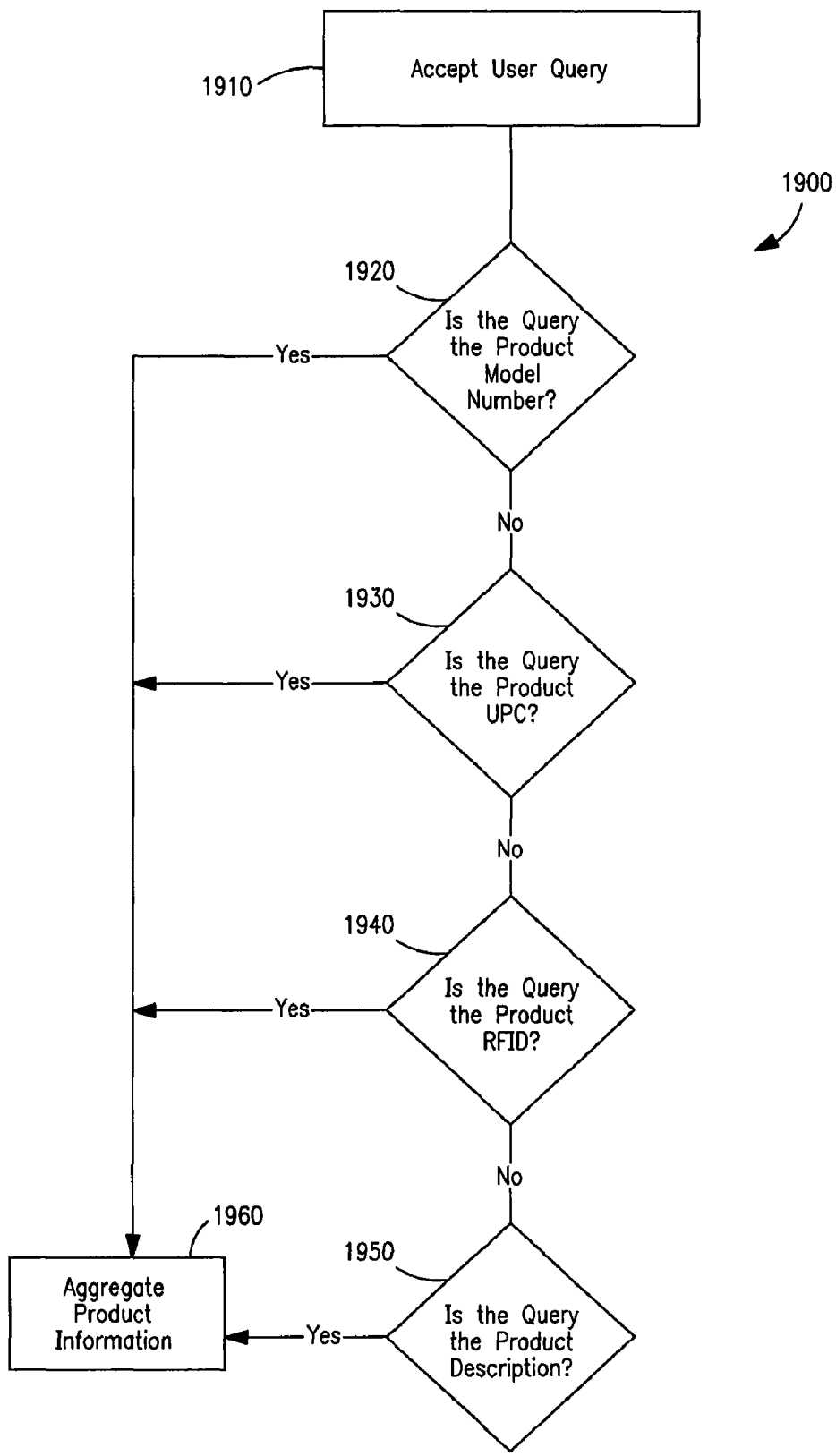
FIG. 19 is a flowchart describing a method for parsing a user query for comparative product information.

With reference now to FIG. 19 of the Drawings, there is illustrated a procedure for parsing a user-input comparative query. The procedure, generally designated by the reference numeral 1900, begins upon the acceptance of a user query 1910, e.g., input within the query entry window 1030 or other input means. The methodology 1900 first queries whether the input query is the Product Model Number or like identifier (step 1920). If so, then the information is then aggregated (step 1960) for further comparisons or delivery to the requester. If not, then the methodology 1900 queries whether the input query is instead the product UPC or like identifier (step 1930); otherwise the query is processed (step 1960). Continuing the determination, if the input query is the product RFID or like identifier (step 1940) or if the input query is the product description (step 1950), the information is then aggregated (step 1960) as above.

Figure 20:
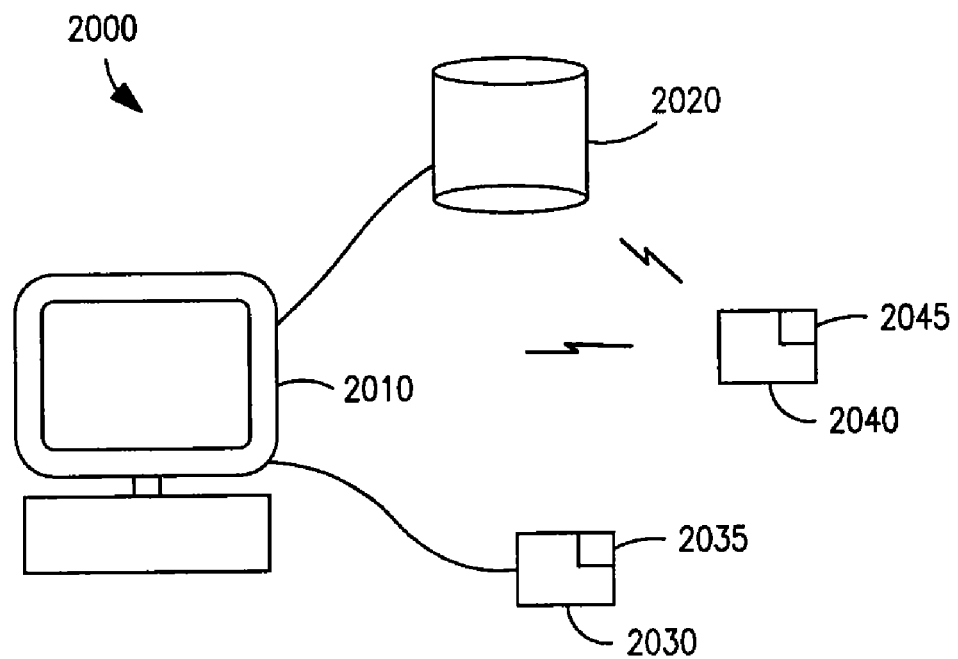
FIG. 20 is an illustration of a system for handling comparative shopping inquiries from a user and processing them using various devices.

With reference now to FIG. 20 of the Drawings, there are illustrated a representative components in a system, generally designated by the reference numeral 2000, that may be employed to utilize and implement the principles of the present invention. As shown, a variety of components may be employed. A computer or PC or laptop 2010 is connected to a database or other storage 2020, within which is stored comparative and other data for a product, e.g., model number, UPC, RFID, description or other information. A handheld device 2030, shown connected to the computer 2010, is employed to scan or otherwise facilitate entry of the user query, e.g., by means of a scanner or other input device, generally designated by the reference numeral 2035. A mobile or wireless device 2040 is also shown which can communicate with the computer 2010 or the database 2020, directly or indirectly, e.g., through a relay, router, the Internet or other communications means, should information be needed from elsewhere, e.g., a website. As with the handheld device 2030, the mobile device 2040 has a scanner or other input means, generally designated by the reference numeral 2045.

Figure 21:
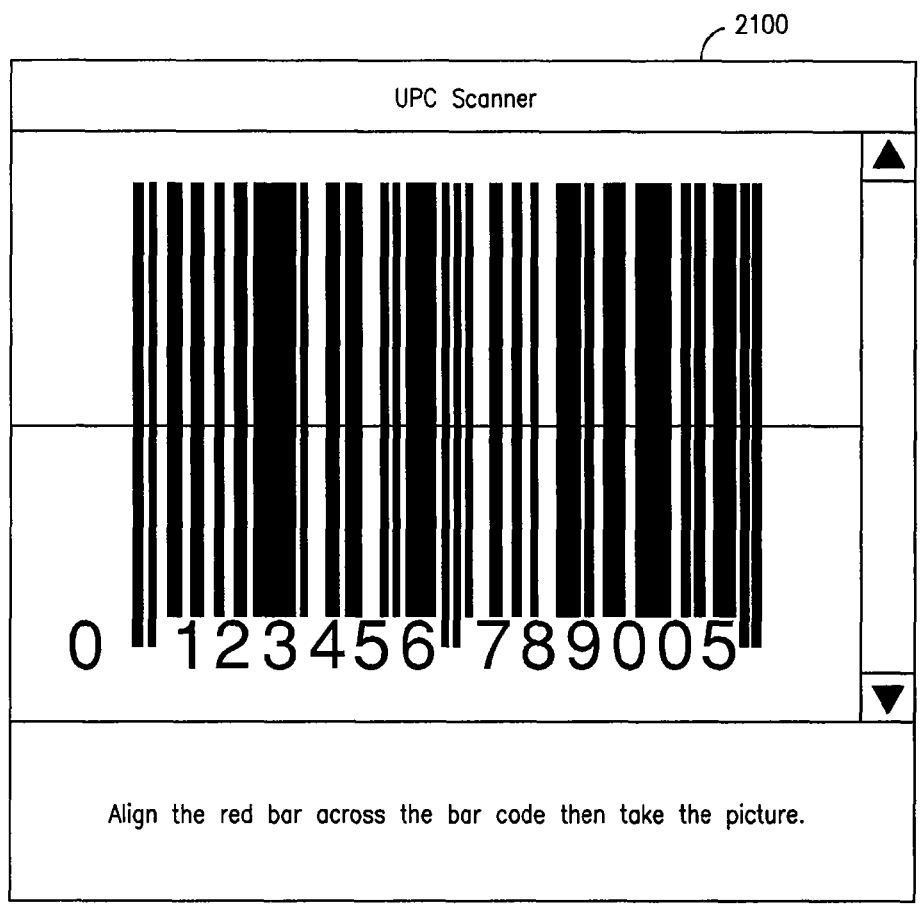
FIG. 21 is an illustration of a scan in progress by a barcode scanner for comparative data about a product.

With reference now to FIG. 21, there is shown a device, e.g., device 2030 or 2040 of FIG. 20, scanning a barcode of a product, particularly, the scanner portions 2035 or 2045 thereof, respectively. By appropriate alignment of the scanner portions 2035/2045, the devices 2030/2040 request the comparative data on the product identifier encoded in the UPC. The display of the scanning process may be visible in the devices 2030/2040 or on the computer 2010, generally designated by the reference numeral 2100.

Figure 22:
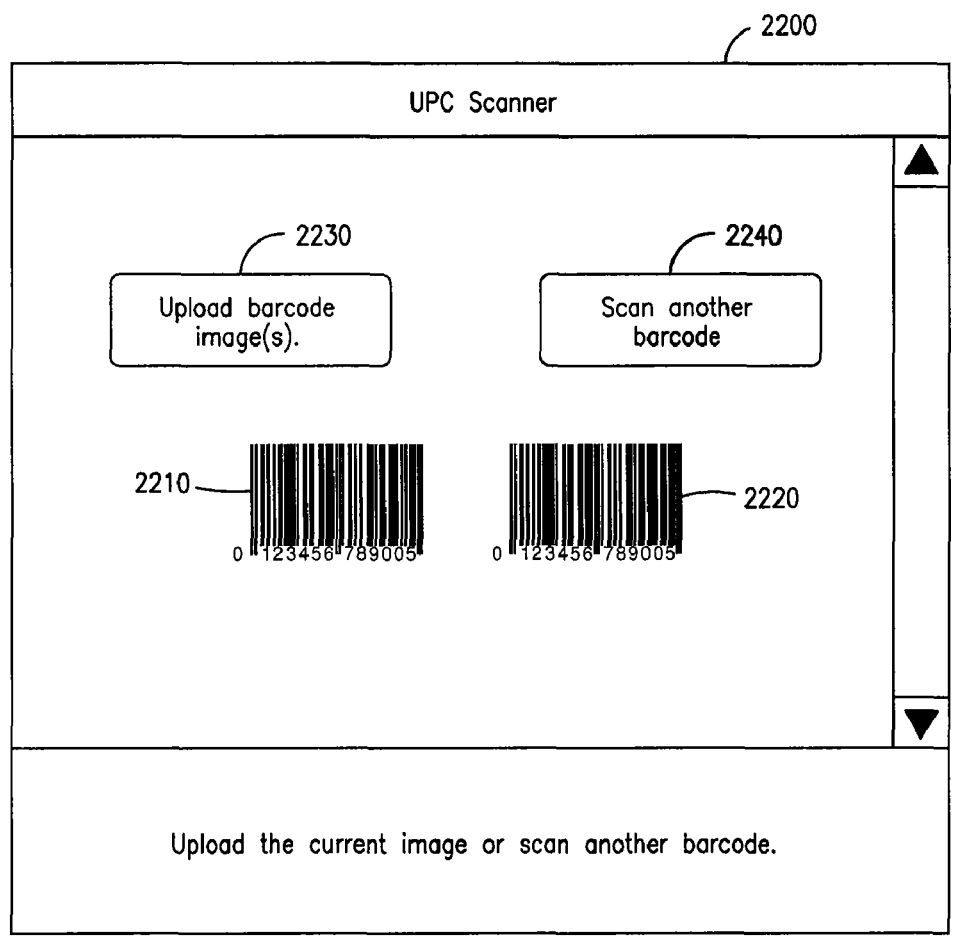
FIG. 22 is a screen shot of a device employed in comparative shopping showing the scanned barcodes and with commands for transport to another machine for analysis.

Shown in FIG. 22 is a screen shot of the device 2030/2040 of FIG. 20 or window of the computer 2010, generally designated by the reference numeral 2200, with commands thereon for uploading barcode or other images. As shown in FIG. 22, two barcoded product identifiers 2210 and 2220 have been input, e.g., in connection with a user query. The interface 2200 asks whether one or more of comparative information for the products, i.e., identifiers 2210 and 2220, be uploaded to the computer 2010, database 2020 or other place for decoding and analysis. In other words, the devices can scan but they cannot discern. The interface 2200 alternatively requests whether another product barcode is for upload, designated by the reference numeral 2240.

Figure 23:
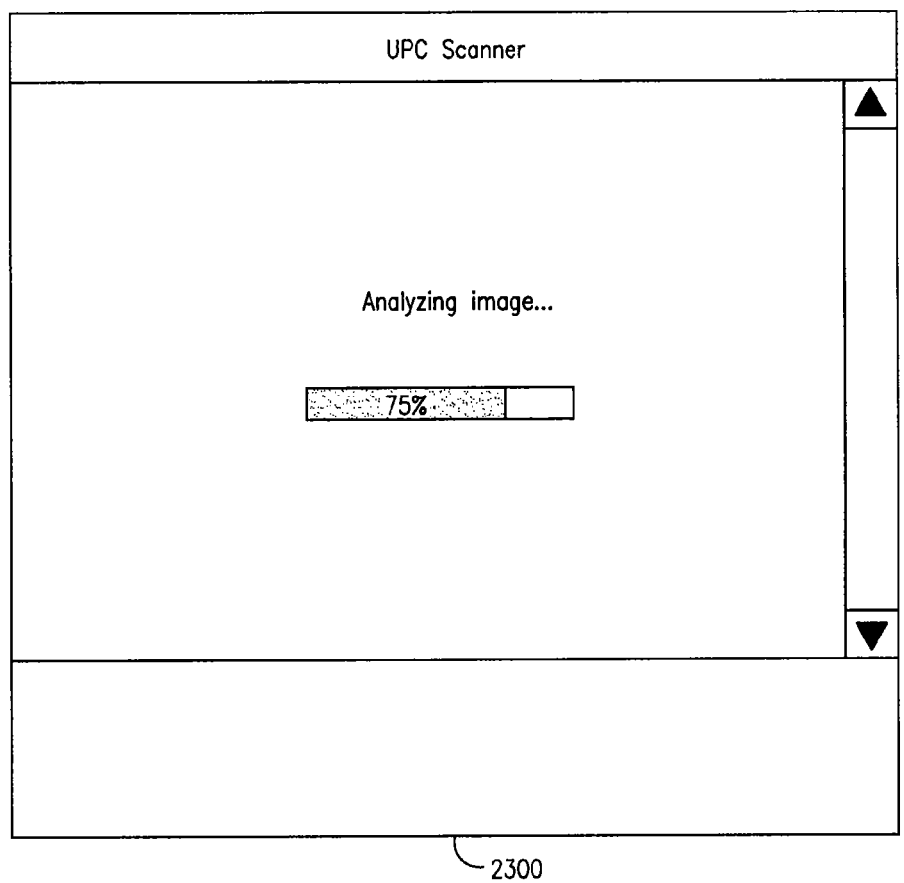
FIG. 23 is a screen shot of a device analyzing the barcode after uploading.

With reference now to FIG. 23 of the Drawings, there is illustrated an image of the device 2030/2040 of FIG. 20 or window on computer 2010 analyzing the barcode (or other identifier) after upload. Unlike the embodiment shown in FIG. 22 where the device 2030/2040 is unable to process the information, a device 2030/2040 here includes code embedded therein for analyzing the barcode (or other identifier) on the device itself. As shown in an interface on the device 2030/2040, generally designated by the reference numeral 2300, the barcode image is being uploaded and analyzed on the spot, based on resident programming. As indicated, the devices described in FIG. 22 must forward the images to the computer 2010, database 2020 or other place for analysis, but may also display the information once analyzed. As shown in FIG. 23, a status bar 2310 can be employed to gauge the progress of analysis.

It should be understood that the interface 2300, although described in connection with usage on the devices 2030/2040, may instead be employed on the computer 2010, e.g., in a window on the screen.

Figure 24:
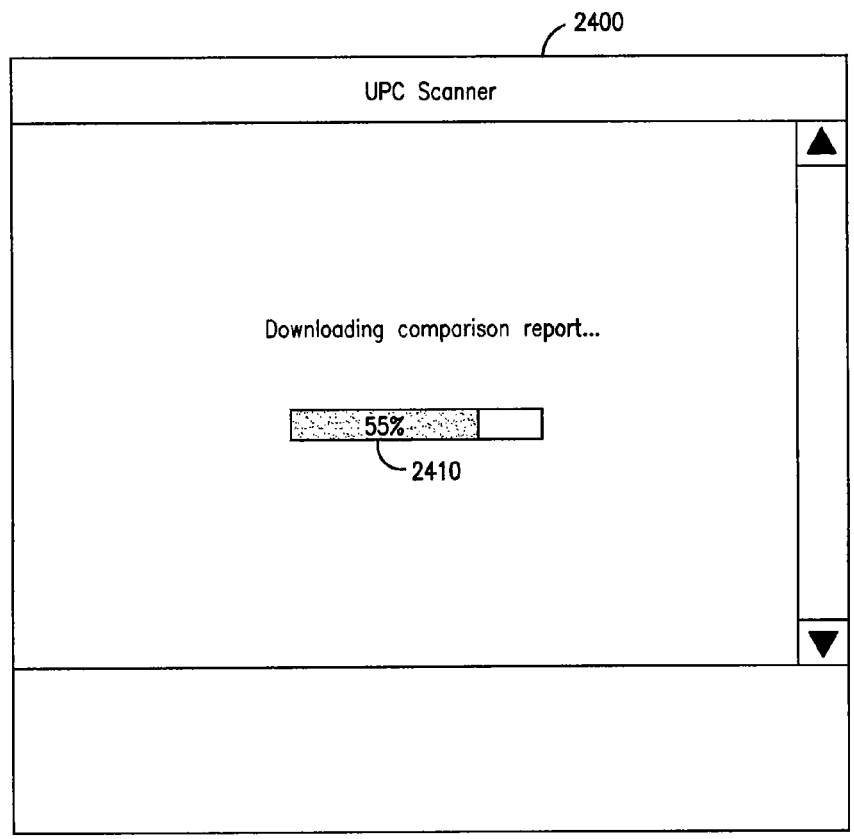
FIG. 24 is a screen shot of a device, such as that in FIGS. 22 and 23, receiving a comparison report.

After acceptance of the user query (FIG. 19) and analysis of the barcode (or other identifier), comparison data is aggregated (step 1960). Shown in FIG. 24 is an interface, generally designated by the reference numeral 2400, indicating that the comparison information, e.g., a report, is being downloaded. As shown in FIG. 24, a status bar 2410 can be employed to gauge the progress of the download.

With reference now to FIG. 25 of the Drawings, there is illustrated a representative comparison chart, generally designated by the reference numeral 2500, delivered to a user interface. For example, the comparison information can be displayed on the device 2030/2040 for a more mobile usage, or on a computer screen or other display.

As noted in FIG. 25, various comparative data may be obtained and displayed to assist a consumer with comparative shopping or selection. As illustrated, more information is available by accessing a scroll bar 2510 or by other means, e.g., the button 1012 or the like. Although two products are illustrated for comparison, i.e., using a first screen 2520 and a second screen 2530, it should of course be understood that three, four or more products can be illustrated and compared simultaneously using separate screens, such as screens 2520 and 2530, or other visualization means.

For example, particular descriptive portions, e.g., television size, resolution, etc., can be directly aligned to assist the consumer in comparative shopping. Other visual aides may also or alternatively be employed to differentiate and distinguish between products, e.g., color coding of entries within the screens 2520 and 2530 to accentuate similarities and differences. Mechanisms could also be in place to dynamically correlate related or disparate information about a product across several screens or product displays, e.g., by highlighting one feature in one product causing other such features of other products to become more prominent or visible.

The principles of the present invention set forth hereinabove also work well in a grocery store or restaurant because it provides both real-time and previously cached or stored comparison information that is easily queried and retrievable. For example, a user may be considering purchasing one of several breakfast cereals in a grocery store. Instead of reading each label and independently trying to compare information that might or might not be available on the label, the user can easily scan each box's barcode with the methodology outlined above and focus or limit the comparison query to show the cereal with the most sugar content, the most fiber content, or rank which cereal fits within a certain pre-determined diet plan.

This works very well with restaurant meals in which nutritional information is seldom given on the menu. The user simply enters the product description, in this case the menu item and, preferably the restaurant name, into either a computer or mobile device, such as a cell phone or other mobile device 2040, and queries the system to provide comparison nutritional information about the meal. Of course, for the most part, restaurants more than likely won't have the aggregate information available in a database, so the system itself will construct a database schema that reflects the component parts of the mean and comparisons to similar meals.

Another differentiation with comparison information is beyond simple product pricing and instead deals with comparisons of different internal systems. One example are lines at amusement parks. Since amusement parks have algorithms or estimates on line wait calculated on line length, an information service that compares different wait times at different amusement park rides could be very beneficial to families as they plan where to go next. For instance, a user can use the comparison information system to make a query about five different rides, all within the same walking distance. The system then gathers or "crawls" the available data on line length or line wave and creates a comparison report for both length and time, giving the family data to make an informed and accurate decision. It should, therefore, be understood that the presently claimed technique works nicely with any wait-oriented comparisons, including restaurants, shows, oil change establishments, and the like.

By way of a further example of the present invention, gasoline prices fluctuate in local markets (and fluctuate wildly across wider markets). For instance, in a local metropolitan area, the price of a gallon of gasoline might vary by a few cents between gas stations, but it might easily have a wider variation depending on local promotions, station location, and traffic patterns (sometimes cheaper prices are located near freeway entrances and exits for truck traffic, while more expense prices find their way into residential neighborhoods). Nationwide, gasoline prices vary tremendously, often with differences of 50 cents or more for a gallon.

The alchemy behind these pricing strategies, is, a times, difficult to comprehend, especially when a price war can easily flare up between two competing gas stations across the street from each other while another station a block away pays no attention to the discount his nearby competitors are offering.

This raises some interesting issues for a person looking for the best value for a tank of gas, and it also raises technical limitations on distributing real-time information so that person can make an informed economic decision based on local market variables.

This is where the system, method and apparatus for an interactive shopping news and price information system of the present invention comes to the rescue and saves the user from the vagaries of artificial local price fluctuations. Fortunately, more and more current models of cars are becoming equipped with Global Positioning Systems (GPS) receivers. These receivers are able to tell the driver where the car is, when it will arrive at its destination, and how long (both in minutes and distance) its journey will take.

An enhancement to this current system of GPS communication is the inclusion of the price shopping system. The vehicle's driver, using an enhancement to the present hardware of the GPS system pursuant to the present invention, can add a query to the device looking for the most inexpensive gas prices in X miles or X radius or on certain roads and freeways. By enhancement, it should be understood that this means additional hardware to receive either a satellite internet connection, Wifi in certain locations, or data through a cell tower. GPS, by its nature, does not allow for this back and forth communication.

Once the driver adds the query, the device sends the query to the price information service, which either checks the database cache for current prices in the query area or crawls the prices in real time or checks the data feeds from partner data outlets (in this case, gas stations). Since the query knows (based on GPS location) the position of the car, it can return to the driver the pricing information of stations in the area that the car is in or the area the car is traveling to. Adapting the GPS display to show these prices is a technical procedure that will, more than likely, require additional hardware or coupling to the primary GPS display.

In operation, a driver driving around wants the best price on gas or oil changes, tire service, or any automotive needs that a user would prefer to find the best prices). In a preferred embodiment, the user activates a setting on the GPS unit to find the cheapest gas prices within, say, two miles. As soon as the pricing service finds the prices, based on analyzing the GPS location and store locations, the service pipes this information down to the user's GPS hybrid unit. The unit then populates or displays the prices on the GPS screen so the user can easily see the driving distance and directions to all the possible stations.

Figure 26:
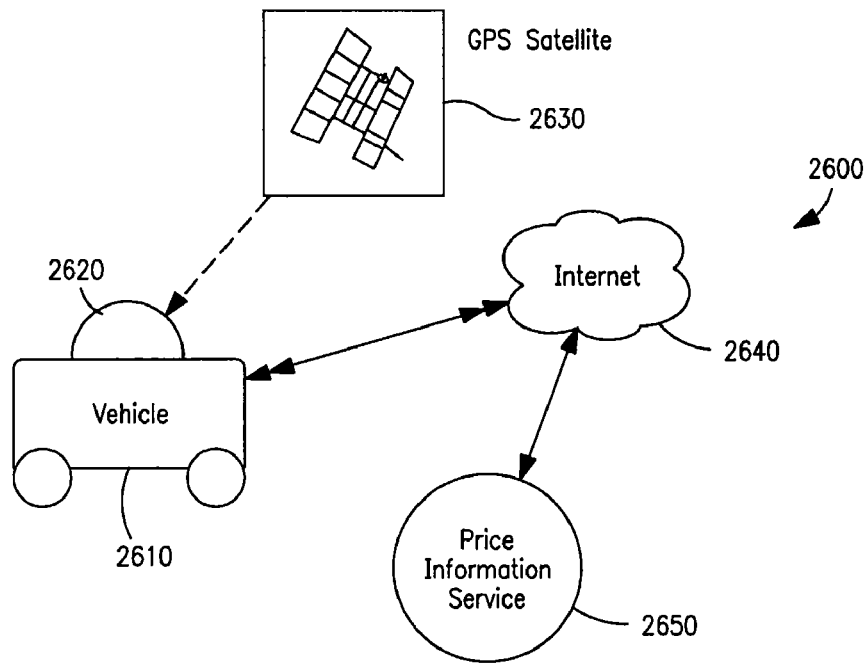
FIG. 26 is an illustration of a system employing the principles of the present invention with GPS location, allowing a user access to telematic comparative data.

With reference now to FIG. 26, there is illustrated an exemplary system for obtaining telematic data from a GPS unit. The system, generally designated by the reference numeral 2600, includes a vehicle 2610 with a GPS unit 2620 therein which is in communication with a number of orbiting satellites 2630, which triangulate the vehicle's position. As indicated above, the driver or other consumer within the vehicle 2610 may desire information on a product, e.g., the price of gasoline, automotive or other products and services, obtained locally. Using the vehicle's location, ascertained by the GPS unit 2620, the consumer initiates a request for comparative product or service information, e.g., establishing wireless communication with the Internet 2640, which has a webpage or other listing of price information requested, generally designated by the reference numeral 2650, which is then forwarded to the requester.

With the geographical data on the location of the desired product, the consumer can then proceed to that location using the GPS or other suitable navigation. Using the methodology of the present invention, telematic comparative or other information can be obtained. It should of course, be understood that the interface for seeking such telematic data must be as much hands-free and unobtrusive as possible to prevent inattentive driving.

Figure 27:
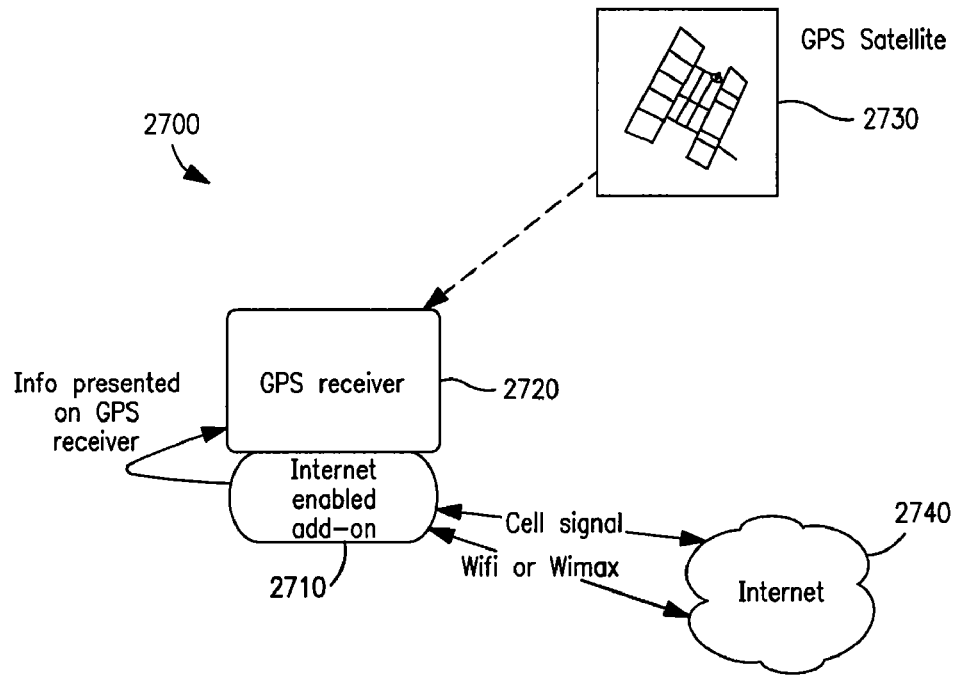
FIG. 27 is an illustration of an alternative embodiment to FIG. 26 where access to the telematic comparative data is facilitated.

With reference now to FIG. 27 of the Drawings, there is illustrated an enhanced GPS device incorporating some of the functionality of the present invention. The exemplary system portrayed, generally designated by the reference numeral 2700, has a GPS unit 2720 within the vehicle in communication with the orbiting satellites 2730, along with an Internet-enabling connection 2710 to connect to the Internet 2730 and webpages or other information therein, as discussed hereinabove. As illustrated, the GPS unit-to-Internet wireless connection can constitute a cell phone signal, Wifi, Wimax or any of a number of wireless communications protocols.

It should, of course, now be understood that the principles of the present invention can be employed in a large variety of comparative scenarios, only some of which are elaborated upon herein. It should be understood that query results can be any text, textual style, words, symbols, graphics, visuals, video, music or other format or any combinations thereof that are conducive for the user to best understand the comparative information.

Having described preferred embodiments of a novel system, method and apparatus for efficiently searching electronic commerce websites over the Internet (which are intended to be illustrative and not limiting), note that modifications and variations can be made by persons skilled in the art in light of the above teachings. Therefore, understand that changes may be made in the particular embodiments disclosed which are within the scope and spirit of what is described as defined by the appended claims.

What is claimed is:

1. A method comprising:
receiving, from a device, a single search query that includes a plurality of identifiers corresponding to a plurality of products;
determining whether the single search query includes a live shopping override;
querying one or more local databases with the plurality of identifiers to identify information on the plurality of products if the single search query does not include the live shopping override;
if the single search query includes the live shopping override, establishing a direct data link with a website that includes the information on the plurality of products, wherein the direct data link can only be used at one or more specific agreed upon times;
generating a comparison chart that includes the information on the plurality of products, wherein the comparison chart also includes comparative data for at least one of the plurality of products; and
providing the comparison chart to the device in response to the single search query.

2. The method according to claim 1, wherein the device comprises a portable device.

3. The method according to claim 2, wherein the portable device comprises at least one of a cell phone, a radio frequency identification (RFID) reader, or a personal digital assistant (PDA).

4. The method according to claim 1, wherein the comparison chart is provided in an e-mail, in a text message, through a phone call, through a phone call with text to speech, or in a video.

5. The method according to claim 1, wherein the plurality of identifiers comprise one or more of a universal product code (UPC), a radio frequency identification (RFID), a product model number, or a product description.

6. The method of claim 1, further comprising:
obtaining the information through the direct data link; and
updating the one or more local databases with the information.

7. A system comprising:
a receiver configured to receive a single search query that includes a plurality of identifiers corresponding to a plurality of products; and
a processor operatively coupled to the receiver and configured to:
determine whether the single search query includes a live shopping override;
query one or more local databases with the plurality of identifiers to identify information on the plurality of products if the single search query does not include the live shopping override;
if the single search query includes the live shopping override, establish a direct data link with a website that includes the information on the plurality of products, wherein the direct data link can only be used at one or more specific agreed upon times;
generate a comparison chart that includes the information on the plurality of products, wherein the comparison chart also includes comparative data for at least one of the plurality of products; and
provide the comparison chart in response to the single search query.

8. The system according to claim 7, wherein the single search query is received from at least one of a cell phone, a radio frequency identification (RFID) reader, or a personal digital assistant (PDA).

9. The system according to claim 7, wherein the comparison chart is provided through at least one of instant messaging, text messaging, a phone call, a phone call with text to speech, an email, or a video.

10. The system according to claim 7, wherein the plurality of identifiers comprise one or more of a universal product code (UPC), a radio frequency identification (RFID), a product model number, or a product description.

11. The system according to claim 7, wherein the comparison chart is provided in e-mail, in a text message, through a phone call, through a phone call with text to speech, or in a video.

12. A device comprising:
an input configured to receive a single search query that includes a plurality of identifiers corresponding to a plurality of products;
a transmitter operatively coupled to the input and configured totransmit the single search query to a remote device;
a receiver configured to receive, from the remote device, a comparison chart that includes information on the plurality of products, wherein the comparison chart also includes comparative data for at least one of the plurality of products, wherein the information on the plurality of products is obtained from one or more local databases if the single search query does not include a live shopping override, and wherein the information on the plurality of products is obtained through a direct data link with a website if the single search query includes the live shopping override; and
a display configured to display the comparison chart.

13. A tangible computer-readable medium having instructions stored thereon, the instructions comprising:
instructions to process a received single search query that includes a plurality of identifiers corresponding to a plurality of products;
instructions to determine whether the single search query includes a live shopping override;
instructions to query one or more local databases with the plurality of identifiers to identify information on the plurality of products if the single search query does not include the live shopping override;
instructions to establish a direct data link with a website if the single search query includes the live shopping override, wherein the website includes the information on the plurality of products, and wherein the direct data link can only be used at one or more specific agreed upon times;
instructions to generate a comparison chart that includes the information on the plurality of products, wherein the comparison chart also includes comparative data for at least one of the plurality of products; and
instructions to provide the comparison chart in response to the single search query.

14. The tangible computer-readable medium of claim 13, wherein the instructions to provide the comparison chart comprise instructions to provide the comparison chart in an e-mail, in a text message, through a phone call, through a phone call with text to speech, or in a video.

* * * * *

UNITED STATES PATENT AND TRADEMARK OFFICE
CERTIFICATE OF CORRECTION

| | | |
|---|---|---|
| PATENT NO. | : 8,255,291 B1 | Page 1 of 1 |
| APPLICATION NO. | : 11/674134 | |
| DATED | : August 28, 2012 | |
| INVENTOR(S) | : Nair | |

It is certified that error appears in the above-identified patent and that said Letters Patent is hereby corrected as shown below:

On the Title Page, in Field (56), under "OTHER PUBLICATIONS", in Column 2, Line 2, delete "199," and insert -- 1999, --, therefor.

In Fig. 14, Sheet 15 of 27, under Tag "1530", in Line 7, delete "Excercize" and insert -- Exercise --, therefor.

In Column 2, Line 35, delete "consumers" and insert -- consumers. --, therefor.

In Column 17, Line 30, delete "past" and insert -- passed --, therefor.

In Column 18, Line 39, delete "150"" and insert -- 150''' --, therefor.

In Column 28, Line 23, in Claim 12, delete "totransmit" and insert -- to transmit --, therefor.

Signed and Sealed this
Twenty-sixth Day of February, 2013

Teresa Stanek Rea
*Acting Director of the United States Patent and Trademark Office*